(12) United States Patent
Yoo et al.

(10) Patent No.: US 11,694,468 B2
(45) Date of Patent: Jul. 4, 2023

(54) DISPLAY DEVICE AND METHOD OF FABRICATING THE SAME

(71) Applicant: Samsung Display Co., Ltd., Yongin-si (KR)

(72) Inventors: Byung Han Yoo, Suwon-si (KR); Dae-Young Lee, Seoul (KR); Chaungi Choi, Suwon-si (KR); Gee-Bum Kim, Seoul (KR); Jaeik Lim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 215 days.

(21) Appl. No.: 17/171,452

(22) Filed: Feb. 9, 2021

(65) Prior Publication Data

US 2021/0295007 A1 Sep. 23, 2021

(30) Foreign Application Priority Data

Mar. 23, 2020 (KR) ........................ 10-2020-0035169

(51) Int. Cl.
*G06V 40/13* (2022.01)
*G06F 1/16* (2006.01)

(52) U.S. Cl.
CPC ........ *G06V 40/1318* (2022.01); *G06F 1/1609* (2013.01); *G06F 1/1684* (2013.01)

(58) Field of Classification Search
CPC .... G06V 40/12; G06V 40/13; G06V 40/1324; G06V 40/1318; G06V 40/1306; G06V 40/1341; G06V 40/1359; G06V 10/143; G06F 3/0412; G06F 3/041–047; G06F 2203/041–04114; G06F 3/0421; G06F 3/042; H01L 27/323; H01L 27/14627; H01L 27/14643; H01L 27/146; H01L 5/374; H04N 5/335; G02F 1/13312; G02F 1/13338; G02B 27/30; G02B 1/04; G02B 17/002; G02B 6/0053; G02B 5/201; G02B 5/223; G02B 1/041; G02B 3/0056
See application file for complete search history.

(56) References Cited

U.S. PATENT DOCUMENTS

| | | | |
|---|---|---|---|
| 7,829,920 | B2 | 11/2010 | Cho et al. |
| 9,829,614 | B2 | 11/2017 | Smith et al. |
| 9,864,893 | B2 | 1/2018 | Kim et al. |
| 10,146,258 | B2 | 12/2018 | Sinha et al. |

(Continued)

FOREIGN PATENT DOCUMENTS

| | | | |
|---|---|---|---|
| JP | 5847644 B2 | | 1/2016 |
| KR | 10-2008-0012661 A | | 2/2008 |

(Continued)

*Primary Examiner* — Sanjiv D. Patel
(74) *Attorney, Agent, or Firm* — Lewis Roca Rothgerber Christie LLP

(57) ABSTRACT

Disclosed is a display device including a display module, and a sensor layer below the display module for detecting light reflected from the display module, and including a base layer, a sensing layer on the base layer and including a sensing element that detects the light, and an optical pattern layer between the sensing layer and the display module, and including a light-shield section defining openings arranged at intervals when viewed in a plan view, and transmission sections respectively located in the openings.

20 Claims, 18 Drawing Sheets

(56) References Cited

U.S. PATENT DOCUMENTS

| | | |
|---|---|---|
| 10,360,430 B2 | 7/2019 | Zhang et al. |
| 2019/0095674 A1* | 3/2019 | Ko ................... H01L 31/02327 |
| 2019/0157337 A1* | 5/2019 | Lin ................... H01L 27/14621 |
| 2020/0026898 A1* | 1/2020 | Fan ...................... H04N 5/2254 |

FOREIGN PATENT DOCUMENTS

| | | |
|---|---|---|
| KR | 10-1376227 B1 | 3/2014 |
| KR | 10-2018-0004994 A | 1/2018 |
| WO | WO 2017/188715 A2 | 11/2017 |

* cited by examiner

DISPLAY DEVICE AND METHOD OF FABRICATING THE SAME

CROSS-REFERENCE TO RELATED APPLICATION

This application claims priority to, and the benefit of, Korean Patent Application No. 10-2020-0035169 filed on Mar. 23, 2020 in the Korean Intellectual Property Office, the disclosure of which is hereby incorporated by reference in its entirety.

BACKGROUND

The present disclosure relates to a display device, and to a method of fabricating the same.

A display device provides various functions that enable the user to interact with the display device. For example, the display device may display an image to provide information to the user, or may detect the user's input. A recent display device has the function for detecting the user's fingerprint. A method for identifying the fingerprint includes a capacitive method based on a variation in capacitance between electrodes, an optical method in which an optical sensor is used to detect incident light, or an ultrasonic method in which a piezoelectric material is utilized to detect vibration. For recent display devices, an optical sensor for fingerprint recognition may be located on the rear surface of a display panel.

SUMMARY

Some embodiments of the present disclosure provide a display device including an optical sensor with improved sensitivity of fingerprint recognition.

According to some embodiments of the present disclosure, a display device may include a display module, and a sensor layer below the display module for detecting light reflected from the display module, and including a base layer, a sensing layer on the base layer and including a sensing element that detects the light, and an optical pattern layer between the sensing layer and the display module, and including a light-shield section defining openings arranged at intervals when viewed in a plan view, and transmission sections respectively located in the openings.

When viewed in a plan view, the light-shield section may enclose the transmission sections and the light-shield section does not overlap the transmission sections.

Each of the transmission sections may include a first organic material that allows the light to pass therethrough, wherein the light-shield section includes a second organic material that absorbs the light.

The display device may further include an etch stop layer between the sensing element and the optical pattern layer.

The sensing element may include a first sensing electrode on the base layer, a second sensing electrode between the first sensing electrode and the etch stop layer, and a sensing part between the first sensing electrode and the second sensing electrode.

The sensor layer may further include an insulation layer between the base layer and the etch stop layer, and covering the sensing element, wherein the etch stop layer is directly located on the insulation layer.

A thickness of the etch stop layer may be less than a thickness of each of the insulation layer and the optical pattern layer.

The display module may include an active area, and a peripheral area adjacent to the active area, wherein the sensor layer includes a detection area overlapping the active area.

The detection area may include a sensing area overlapping the sensing element, and a non-sensing area enclosing the sensing area, wherein each of the transmission sections overlaps the sensing area.

The light-shield section may overlap the non-sensing area, wherein the optical pattern layer further includes an auxiliary transmission section overlapping the non-sensing area.

When viewed in a thickness direction of the sensor layer, a height of each of the transmission sections may be greater than a height of the auxiliary transmission section.

The sensor layer may further include an anti-electrostatic layer located on the light-shield section, the anti-electrostatic layer overlapping the non-sensing area.

The display device may further include an infrared filter between the display module and the sensor layer.

The display module may include a base substrate having a pixel area, and a light-shield area adjacent to the pixel area, and a display element layer on the base layer, and including an emission layer overlapping the pixel area, wherein the transmission sections overlap the light-shield area.

The optical pattern layer may further include a mask pattern on the transmission sections, wherein the mask pattern does not overlap the light-shield section.

According to some embodiments of the present disclosure, a display device may include a display module, and an optical sensor below the display module for detecting light reflected from the display module, and including a base layer, a sensing layer on the base layer, and including a sensing element that detects the light, an optical pattern layer between the sensing layer and the display module, and including a light-shield section in which openings are arranged at an interval when viewed in a plan view, and transmission sections respectively located in the openings and enclosed by the light-shield section when viewed in a plan view, and an etch stop layer between the sensing layer and the optical pattern layer.

A planar area of the light-shield section may be greater than a planar area of the transmission sections.

A distance between the sensing layer and the light-shield section may be equal to or less than about 5 micrometers.

According to some embodiments of the present disclosure, a method of fabricating a display device may include forming an optical sensor, and attaching the optical sensor through an adhesive member to a display module, wherein forming the optical sensor includes preparing a base layer, forming, on the base layer, a sensing element for detecting light reflected from the display module, forming, on the base layer, an insulation layer including an inorganic material and covering the sensing element, forming an etch stop layer on the insulation layer and overlapping the sensing element, forming, directly on the etch stop layer, transmission sections including a first organic material, and forming, directly on the etch stop layer, a light-shield section including a second organic material, and not overlapping the transmission sections.

When viewed in a plan view, the light-shield section may enclose the transmission sections, wherein top surfaces of the transmission sections are exposed by the light-shield section.

DETAILED DESCRIPTION

Figure 1:
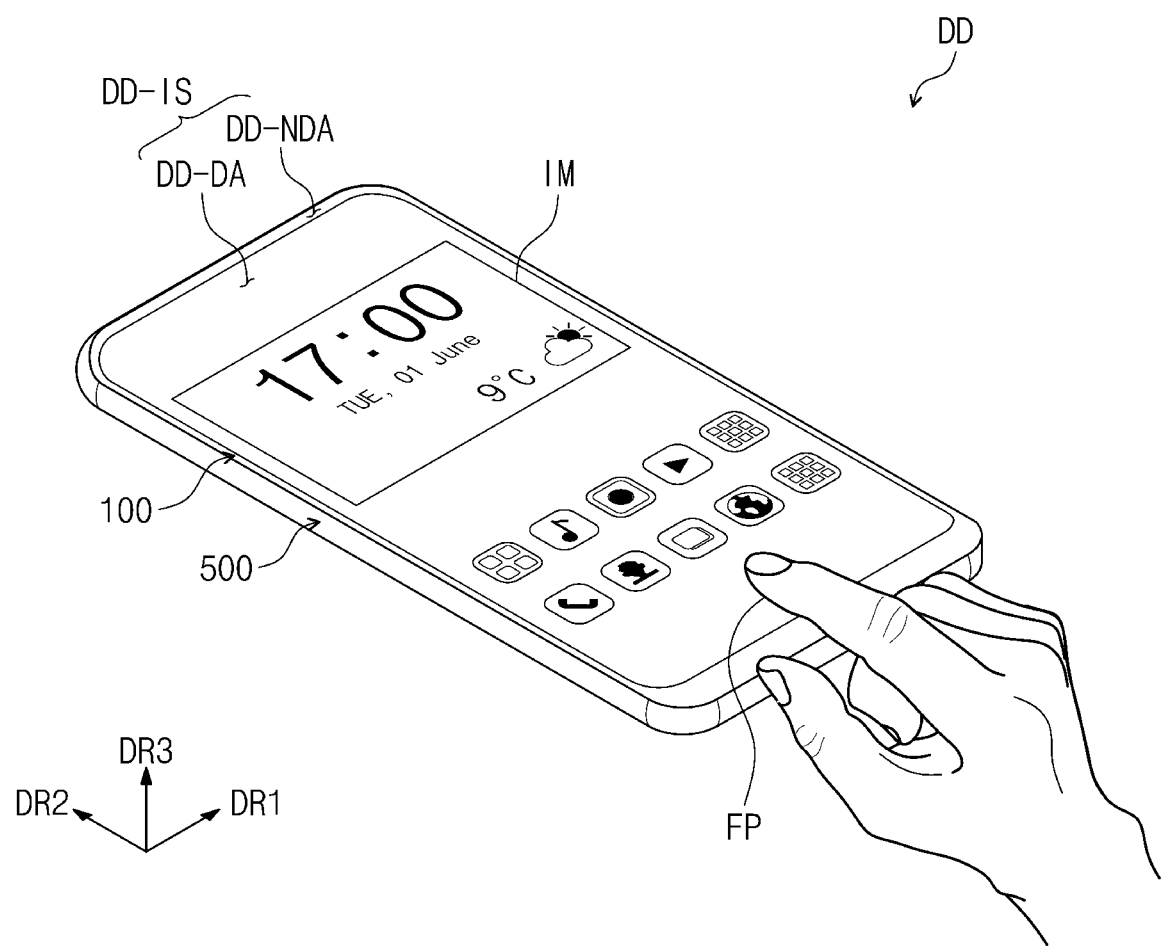
FIG. 1 illustrates a perspective view showing a display device according to some embodiments of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "at least one selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
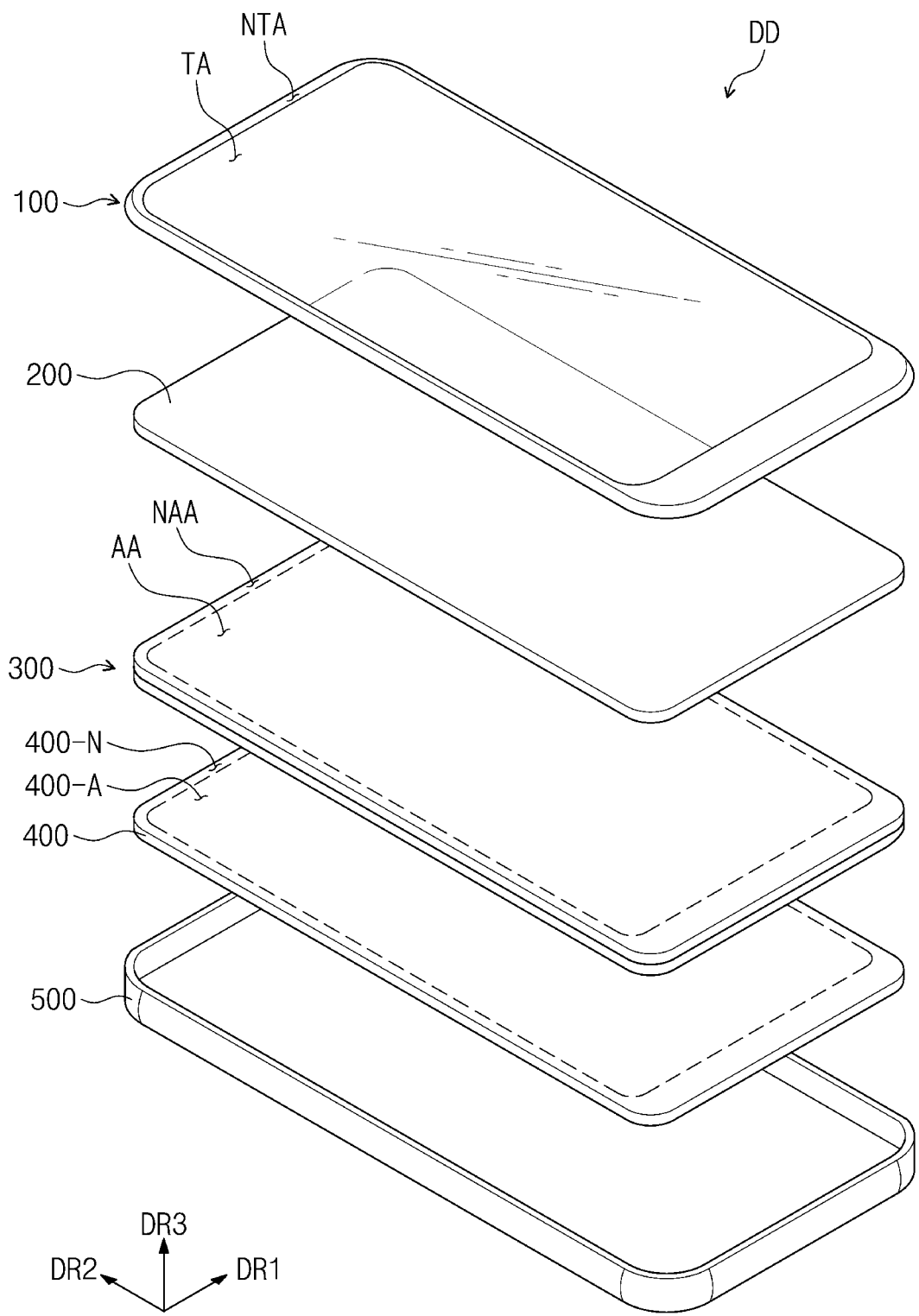
FIG. 2 illustrates an exploded perspective view showing a display device according to some embodiments of the present disclosure.

FIG. 1 illustrates a perspective view showing a display device according to some embodiments of the present disclosure, and FIG. 2 illustrates an exploded perspective view showing a display device according to some embodiments of the present disclosure.

Referring to FIG. 1, a display device DD may be an apparatus activated with an electrical signal. The display device DD may include various embodiments. For example, the display device DD may be used for large-sized electronic apparatuses, such as televisions, monitors, or outdoor billboards, and also may be used for small and medium-sized electronic apparatuses, such as personal computers, laptop computers, personal digital terminals, automotive navigation units, game consoles, portable electronic devices, or cameras. These products are merely presented as examples, and the display device DD can be adopted for any suitable electronic apparatus unless departing from the spirit of the present disclosure. In some embodiments, a smart phone is illustrated as an example of the display device DD.

The display apparatus DD may display an image IM on a display surface DD-IS. According to some embodiments of the present disclosure, the display device DD is illustrated to have the flat display surface DD-IS of a flat shape, but the present disclosure is not necessarily limited thereto. The display apparatus DD may include a curved display surface or a cubic display surface. The cubic display surface may include a plurality of display regions oriented in different directions or have a polygonal pillar-shaped display surface.

The display surface DD-IS includes a display area DD-DA on which the image IM is displayed and a non-display area DD-NDA adjacent to the display area DD-DA. The non-display area DD-NDA may be a region that does not display an image. The display surface DD-IS may correspond to a front surface of the display device DD and to a front surface of a window 100 which will be discussed below. FIG. 1 shows application icons and a clock window as examples of the image IM.

The display area DD-DA has a tetragonal shape, and the non-display area DD-NDA is illustrated to enclose the display area DD-DA. The present disclosure, however, is not limited thereto, and the display area DD-DA and the non-display area DD-NDA may be designed to have their shapes relatively conforming to each other. For example, the non-display area DD-NDA may be located at one side of the display area DD-DA, or the non-display area DD-NDA may be omitted.

The display surface DD-IS may be parallel to a plane defined by a first direction DR1 and a second direction DR2. A third direction DR3 indicates a normal direction to the display surface DD-IS, or a thickness direction of the display device DD. In this disclosure, the description "when viewed in a plan view", "on a plane", or "a planar area" means a case when viewed in the third direction DR3. Herein, the third direction DR3 differentiates front and rear surfaces (or top and bottom surfaces) of each member or unit which will be discussed below. However, the first to third directions DR1 to DR3 shown in some embodiments are merely exemplary, and directions indicated by the first to third directions DR1 to DR3 can be changed to their reverse directions.

The display device DD according to some embodiments of the present disclosure may detect a user's input externally applied. In some embodiments, depending on its structure, the display device DD may detect a user's input applied to a lateral or rear surface thereof, but the present disclosure is not limited to a particular embodiment.

The display device DD may detect a user's fingerprint FP externally applied. A fingerprint recognition region capable of detecting the user's fingerprint FP is provided on the display surface DD-IS of the display device DD. The fingerprint recognition region may be provided on an entirety or a portion of the display area DD-DA.

Referring to FIG. 2, the display device DD may include a window 100, an anti-reflection panel 200, a display module 300, an optical sensor 400, and a housing 500. In some embodiments, as shown in FIG. 1, the window 100 and the housing 500 may be coupled to each other to form an appearance of the display device DD. The window 100 may include an optically transparent insulating material. For example, the window 100 may include glass or plastic. The window 100 may have a multi-layered structure or a single-layered structure. For example, the window 100 may include either a plurality of plastic films that are coupled through an adhesive, or may include a glass substrate and a plastic film coupled to each other through an adhesive.

A front surface of the window 100 defines a front surface of the display device DD. The front surface of the window 100 includes a transmission area TA and a non-transmission area NTA. The transmission area TA corresponds to the display area DD-DA of the display device DD shown in FIG. 1, and the non-transmission area NTA corresponds to the non-display area DD-NDA of the display device DD shown in FIG. 1. The transmission area TA may be an optically transparent region. For example, the transmission area TA may be a region whose visible light transmittance is equal to or greater than about 90%.

The non-transmission area NTA may be a region whose optical transmittance is relatively less than that of the transmission area TA. The non-transmission area NTA defines a shape of the transmission area TA. The non-transmission area NTA may have a certain color. In some other embodiments, the non-transmission area NTA may be omitted.

The anti-reflection panel 200 may be located below the window 100. The anti-reflection panel 200 may reduce a reflectance of external light that is incident from outside the window 100. In some embodiments of the present disclosure, the anti-reflection panel 200 may be omitted, or may be a component included in the display module 300.

The display module 300 may display the image IM and may detect an external input. The display module 300 may include an active area AA and a peripheral area NAA. The active area AA may be a region that is activated with an electric signal.

In some embodiments, the active area AA may be a region that displays the image IM and also detects an external input. The active area AA may overlap the transmission area TA, and the peripheral area NAA may overlap the non-transmission area NTA. For example, the transmission area TA may overlap an entirety or at least a portion of the active area AA. Accordingly, users may recognize the image IM through the transmission area TA, or may provide an external input through the transmission area TA. In some embodiments of the present disclosure, the active area AA may be configured such that a region to display the image IM is separated from a region to detect an external input, but the present disclosure is not limited to a particular embodiment.

The peripheral area NAA may be a region covered with the non-transmission area NTA. The peripheral area NAA is adjacent to the active area AA. The peripheral area NAA may enclose the active area AA. The peripheral area NAA may include a driver line or a driver circuit for driving the active area AA.

The optical sensor 400 may be located below the display module 300. The optical sensor 400 may be a sensor layer that detects user's biometric information. The optical sensor 400 may detect a surface of a touch target. The surface may include surface uniformity or surface morphology. For example, the surface may enable detection of information of the user's fingerprint FP.

The optical sensor 400 may include a detection area 400-A and a non-detection area 400-N. The detection area 400-A may be a region that is activated with an electrical signal. For example, the detection area 400-A may be a region to detect biometric information. The non-detection area 400-N may include a driver line or a driver circuit for driving the detection area 400-A.

In some embodiments of the present disclosure, the detection area 400-A may overlap an entirety of the active area AA. In this case, the fingerprint recognition may be performed on the entirety of the active area AA. For example, the user's fingerprint FP may be recognized on an entire region excluding a restricted partial region. The present disclosure, however, is not necessarily limited thereto. For example, in some other embodiments of the present disclosure, the optical sensor 400 may partially overlap the active area AA.

The housing 500 is coupled to the window 100. The housing 500 and the window 100 are coupled to each other to provide an inner space. The display module 300 and the optical sensor 400 may be accommodated in the inner space. The housing 500 may stably protect, from external impact, components of the display device DD that are accommodated in the inner space. The housing 500 may include a material whose rigidity is relatively high. For example, the housing 500 may include glass, plastics, or metal, or may include a plurality of frames or plates consisting of any combination of glass, plastics, and metal.

In other embodiments, the optical sensor 400 and the housing 500 may be provided therebetween with a battery module to provide power required for overall operation of the display device DD.

Figure 3:
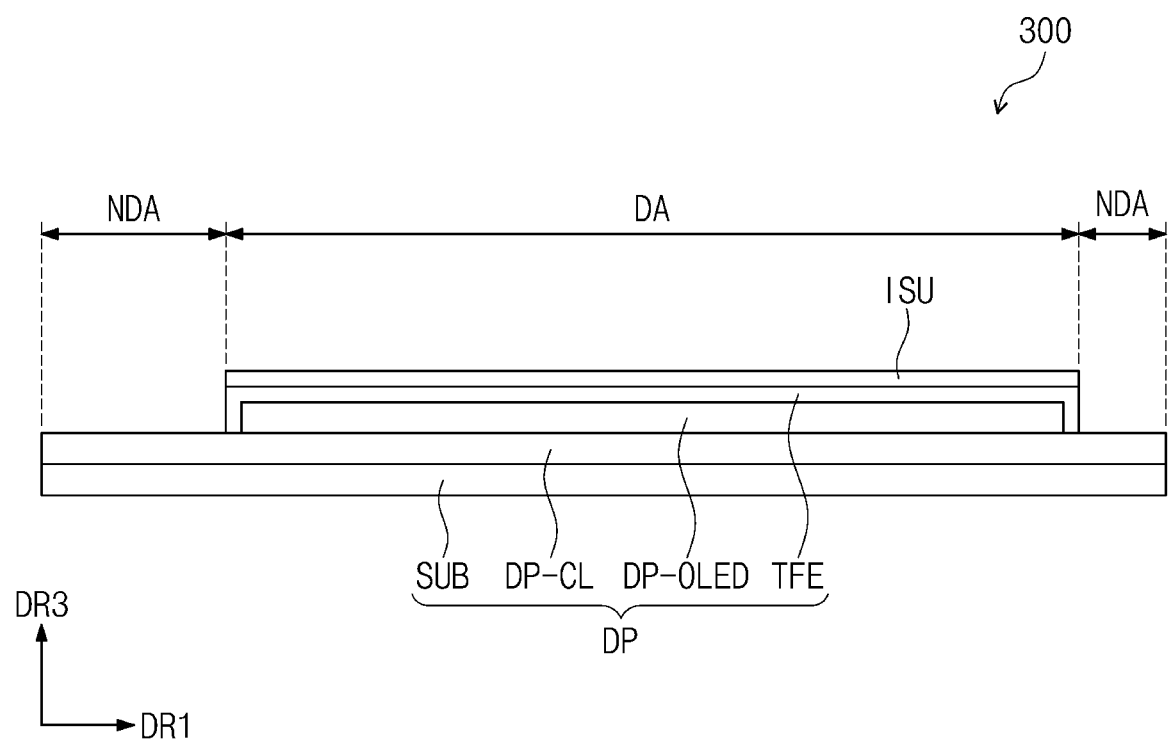
FIG. 3 illustrates a cross-sectional view showing a display module according to some embodiments of the present disclosure.

FIG. 3 illustrates a cross-sectional view showing a display module according to some embodiments of the present disclosure.

Referring to FIG. 3, the display module 300 includes a display panel DP and an input sensing layer ISU. The display panel DP includes a base substrate SUB, and also includes a circuit element layer DP-CL, a display element layer DP-OLED, and an insulation layer TFE that are located on the base substrate SUB.

According to some embodiments of the present disclosure, the display panel DP may be an emissive display panel, but the type of the display panel DP is not particularly limited. For example, the display panel DP may be an organic light emitting display panel or a quantum-dot light emitting display panel. An emission layer of an organic light emitting display panel may include an organic light emitting material. An emission layer of the quantum-dot light emitting display panel may include a quantum-dot or a quantum-rod. The following will discuss an example in which an organic light emitting display panel is adopted as the display panel DP.

The display panel DP includes a display area DA and a non-display area NDA. The display area DA of the display panel DP corresponds to the active area AA shown in FIG. 2, and the non-display area NDA of the display panel DP corresponds to the peripheral are NAA shown in FIG. 2.

The base substrate SUB may include at least one plastic film. The base substrate SUB may include a flexible substrate, for example, a plastic substrate, a glass substrate, a metal substrate, or an organic/inorganic composite substrate.

The circuit element layer DP-CL includes at least one intermediate insulation layer and a circuit element. The intermediate insulation layer includes at least one intermediate inorganic layer and at least one intermediate organic layer. The circuit element includes signal lines and a pixel driver circuit.

The display element layer DP-OLED includes a plurality of organic light emitting diodes. The display element layer DP-OLED may further include an organic layer, such as a pixel definition layer. According to some other embodiments, when the display panel DP is provided in the type of a liquid crystal display panel, the display element layer DP-OLED may be provided in the type of a liquid crystal layer.

The insulation layer TFE encapsulates the display element layer DP-OLED. For example, the insulation layer TFE may be a thin-film encapsulation layer. The insulation layer TFE protects the display element layer DP-OLED against foreign substances, such as moisture, oxygen, and dust particles. The present disclosure, however, is not limited thereto, and the insulation layer TFE may be replaced with an encapsulation substrate. In this case, the encapsulation substrate may stand opposite to the base substrate SUB, and the circuit element layer DP-CL and the display element layer DP-OLED may be located between the encapsulation substrate and the base substrate SUB.

The input sensing layer ISU may be located between the window 100 and the display panel DP. The input sensing layer ISU detects a user's input externally applied. The externally applied user's input may be provided in various types. For example, the external input includes a user's body part, a stylus pen, light, heat, pressure, or any various types of external input. In addition, the external input may not only include a user's touch, but may also include an approaching spatial touch (e.g., a hovering touch).

The input sensing layer ISU may be directly located on the display panel DP. In this disclosure, the phrase "A is directly located on B" means that no adhesive layer is located between A and B. In some embodiments, the input sensing layer ISU and the display panel DP may be fabricated in a successive process. The technical concepts of the present disclosure, however, are not limited thereto. The input sensing layer ISU may be provided in the form of an individual panel, and may be coupled through an adhesive layer to the display panel DP. For another example, the input sensing layer ISU may be omitted.

Figure 4:
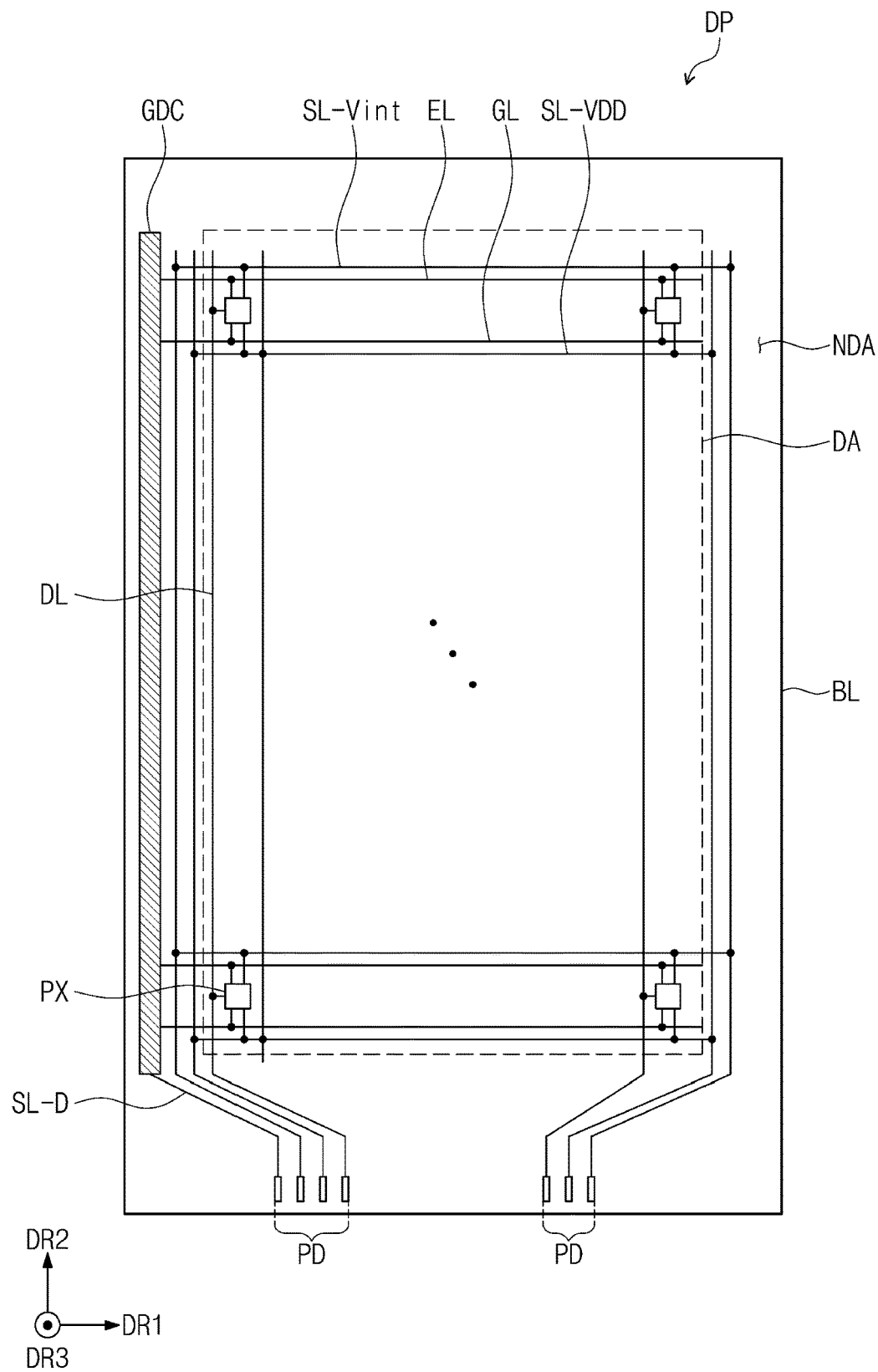
FIG. 4 illustrates a plan view showing a display panel according to some embodiments of the present disclosure.
Figure 5:
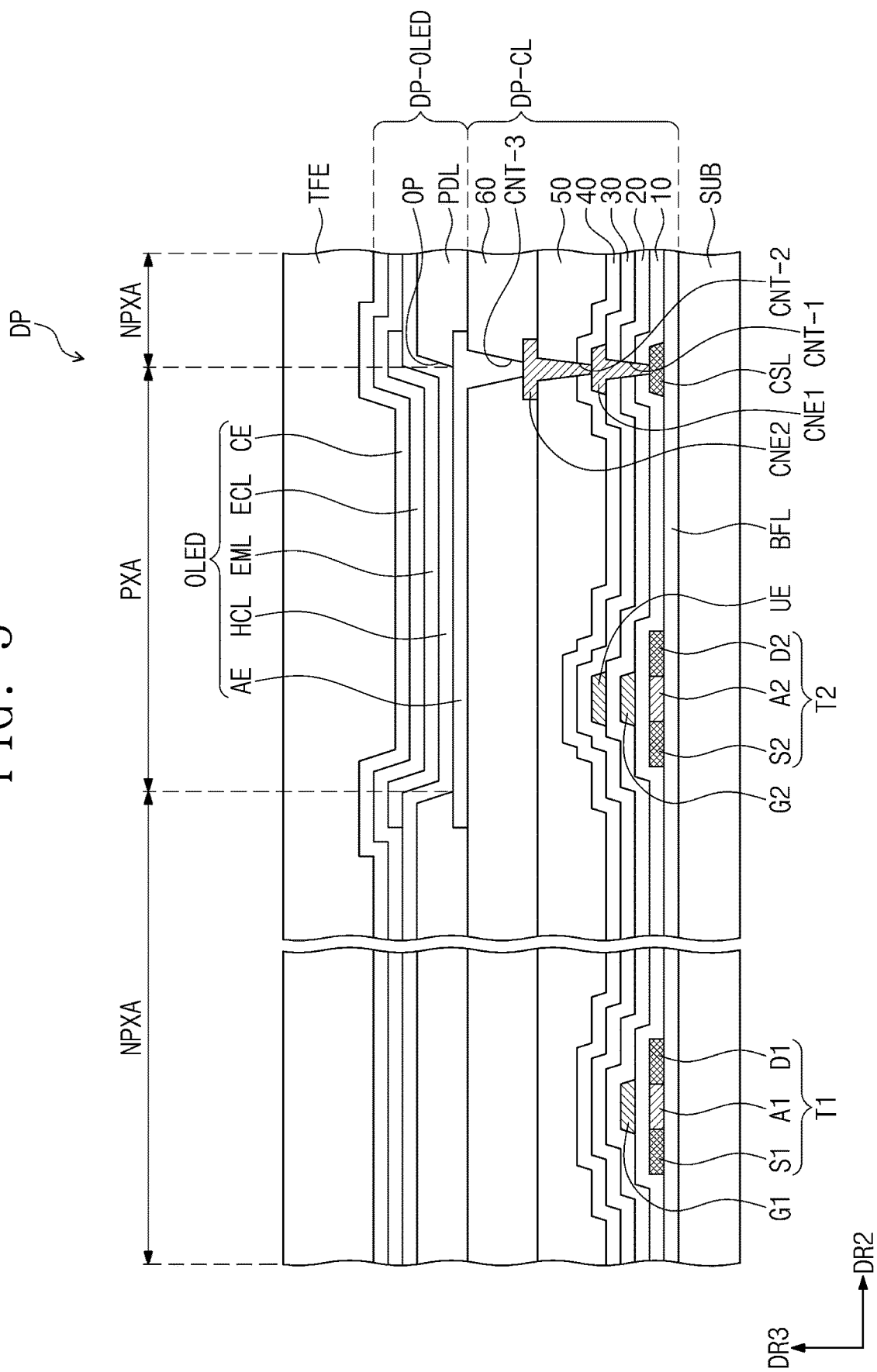
FIG. 5 illustrates a cross-sectional view partially showing a display panel according to some embodiments of the present disclosure.

FIG. 4 illustrates a plan view showing a display panel according to some embodiments of the present disclosure, and FIG. 5 illustrates a cross-sectional view partially showing a display panel according to some embodiments of the present disclosure.

Referring to FIG. 4, the display panel DP includes a driver circuit GDC, a plurality of signal lines SL-Vint, SL-VDD, EL, GL, DL, and SL-D, a power electrode, and a plurality of pixels PX. The display area DA may be defined as a region where the plurality of pixels PX are located.

The driver circuit GDC may generate a plurality of scan signals, and the plurality of scan signals may be sequentially output to a plurality of scan lines GL, which will be discussed below. In addition, the driver circuit GDC may generate a plurality of emission control signals, and the plurality of emission control signals may be output to a plurality of emission control lines EL which will be discussed below.

FIG. 4 shows that a plurality of scan signals and a plurality of emission control signals are output from a single driver circuit GDC, but the present disclosure is not necessarily limited thereto. In some embodiments of the present disclosure, the driver circuit GDC may be configured such that a plurality of scan signals are split and then output, and that a plurality of emission control signals are split and then output. In addition, a driver circuit to generate and output a plurality of scans signals may be separately distinguished from a driver circuit to generate and output a plurality of emission control signals.

The driver circuit GDC may be included in the circuit element layer (e.g., see circuit element layer DP-CL of FIG. 3). The driver circuit GDC may include a plurality of thin film transistors that are formed in the same process in which a driver circuit for the pixel PX is formed.

In other embodiments, the display panel DP may further include a data driver circuit that is coupled to pads PD in a chip-on-film (COF) manner. In some embodiments of the present disclosure, the data driver circuit may also be integrated in the circuit element layer DP-CL.

The plurality of signal lines GL, DL, EL, SL-VDD, SL-Vint, and SL-D may include scan lines GL, emission control lines EL, data lines DL, a power line SL-VDD, an initialization voltage line SL-Vint, and a control signal line SL-D. The plurality of signal lines GL, DL, EL, SL-VDD, SL-Vint, and SL-D may be included in the circuit element layer DP-CL, and some signal lines may be omitted in various embodiments. The pads PD may be connected to ends of the plurality of signal lines GL, DL, EL, SL-VDD, SL-Vint, and SL-D.

Each of the scan lines GL is connected to a corresponding one of the plurality of pixels PX, and each of the data lines DL is connected to a corresponding one of the plurality of pixels PX. The emission control lines EL may be parallel to corresponding scan lines GL.

The power line SL-VDD may be connected to the plurality of pixels PX, and may provide the plurality of pixels PX with a first power voltage. The power line SL-VDD may include a plurality of lines that extend in the first direction DR1 and a plurality of lines that extend in the second direction DR2.

The initialization voltage line SL-Vint may provide the plurality of pixels PX with an initialization voltage. The initialization voltage line SL-Vint may include a plurality of lines that extend in the first direction DR1 and a plurality of lines that extend in the second direction DR2.

The control signal line SL-D may provide the driver circuit GDC with control signals. The control signal line SL-D may provide the power electrode with a second power voltage. The second power voltage may have a level that is different from that of the first power voltage.

Referring to FIG. 5, the display panel DP may include a plurality of insulation layers, a semiconductor pattern, a conductive pattern, and a signal line. A coating or deposition process may form an insulation layer, a semiconductor layer, and a conductive layer. Afterwards, a photolithography process may selectively pattern the insulation layer, the semiconductor layer, and the conductive layer. The processes mentioned above may form the semiconductor pattern, the conductive pattern, and the signal line that are included in the circuit element layer DP-CL and the display element layer DP-OLED.

The base substrate SUB may include a synthetic resin film. The synthetic resin film may include a thermosetting resin. The base substrate SUB may have a multi-layered structure. For example, the base substrate SUB may have a tri-layered structure including a synthetic resin layer, an adhesive layer, and a synthetic resin layer. For example, the synthetic resin layer may be a polyimide-based resin layer, but the material of the synthetic resin layer is not particularly limited. The synthetic resin layer may include at least one selected from acryl-based resin, methacryl-based resin, polyisoprene, vinyl-based resin, epoxy-based resin, urethane-based resin, cellulose-based resin, siloxane-based resin, polyamide-based resin, and perylene-based resin. The base substrate SUB may include a glass substrate, a metal substrate, and/or an organic/inorganic composite substrate.

At least one inorganic layer may be formed on a top surface of the base substrate SUB. The inorganic layer may include at least one selected from aluminum oxide, titanium oxide, silicon oxide, silicon oxynitride, zirconium oxide, and hafnium oxide. The inorganic layer may be formed multi-layered. The multi-layered inorganic layers may constitute a barrier layer and/or a buffer layer. In some embodiments, the display panel DP is illustrated to include a buffer layer BFL.

The buffer layer BFL increases a bonding force between the base substrate SUB and the semiconductor pattern. The buffer layer BFL may include a silicon oxide layer and a silicon nitride layer. The silicon oxide layer and the silicon nitride layer may be alternately stacked.

The semiconductor pattern is located on the buffer layer BFL. The semiconductor pattern may include polysilicon. The present disclosure, however, is not limited thereto, and the semiconductor pattern may include amorphous silicon or metal oxide.

FIG. 5 shows a portion of the semiconductor pattern, and when viewed in a plan view, the semiconductor pattern may further be located on another portion of the pixels PX. The semiconductor pattern may be specifically arranged over the pixels PX. The semiconductor pattern may have an electrical property that is determined based on whether the semiconductor pattern is doped or not. The semiconductor pattern may include a doped region and an undoped region. The doped region may be implanted with n-type or p-type impurities. A p-type transistor includes a doped region implanted with p-type impurities.

The doped region has its conductivity greater than that of the undoped region, and substantially serves as an electrode or a signal line. The undoped region substantially corresponds to an active region (or channel) of a transistor. For example, a portion of the semiconductor pattern may be an active region of a transistor, another portion of the semiconductor pattern may be a source region or drain region of the transistor, and still another portion of the semiconductor pattern may be a connection electrode or a connection signal line.

As shown in FIG. 5, a first transistor T1 includes a first source region S1, a first active region A1 and a first drain region D1 that are formed from one semiconductor pattern, and a second transistor T2 includes a second source region S2, a second active region A2 and a second drain region D2 that are formed from the other semiconductor pattern. When viewed in cross-section, the first source region S1 and the first drain region D1 extend in opposite directions from the first active region A1, and likewise, the second source region S2 and the second drain region D2 extend in opposite directions from the second active region A2. FIG. 5 partially shows a connection signal line CSL formed from the semiconductor pattern. In other embodiments, when viewed in a plan view, the connection signal line CSL may be connected to the second drain region D2 of the second transistor T2.

A first intermediate insulation layer 10 is located on the buffer layer BFL. The first intermediate insulation layer 10 commonly overlaps a plurality of pixels PX and covers the semiconductor pattern. The first intermediate insulation layer 10 may be an inorganic layer and/or an organic layer, and may have a single-layered or multi-layered structure. The first intermediate insulation layer 10 may include at least one selected from aluminum oxide, titanium oxide, silicon oxide, silicon oxynitride, zirconium oxide, and hafnium oxide. In some embodiments, the first intermediate insulation layer 10 may be a single-layered silicon oxide layer. Likewise the first intermediate insulation layer 10, a plurality of intermediate insulation layers of the circuit element layer DP-CL may be an inorganic layer and/or an organic layer, as discussed below, and the organic layer of the circuit element layer DP-CL may have a single-layered or multi-layered structure. The inorganic layer may include at least one selected from the materials mentioned above.

The first gate G1 and the second gate G2 are located on the first intermediate insulation layer 10. The first and second gates G1 and G2 may be a portion of a metal pattern. The first and second gates G1 and G2 overlap the first and second actives A1 and A2, respectively. The first and second gates G1 and G2 may serve as a mask in a process where the semiconductor pattern is doped.

A second intermediate insulation layer 20 covering the first and second gates G1 and G2 may be located on the first intermediate insulation layer 10. The second intermediate insulation layer 20 commonly overlaps the pixels PX. The second intermediate insulation layer 20 may be an inorganic layer and/or an organic layer, and may have a single-layered or multi-layered structure. In some embodiments, the second intermediate insulation layer 20 may be a single-layered silicon oxide layer.

An upper electrode UE may be located on the second intermediate insulation layer 20. The upper electrode UE may overlap the second gate G2 of the second transistor T2. The upper electrode UE may be a portion of a metal pattern. A portion of the second gate G2 and its overlying upper electrode UE may define a capacitor.

A third intermediate insulation layer 30 covering the upper electrode UE may be located on the second intermediate insulation layer 20. In some embodiments, the third intermediate insulation layer 30 may be a single-layered silicon oxide layer. A first connection electrode CNE1 may be located on the third intermediate insulation layer 30. The first connection electrode CNE1 may be coupled to the connection signal line CSL through a contact hole CNT-1 that penetrates the first, second, and third intermediate insulation layers 10, 20, and 30.

A fourth intermediate insulation layer 40 covering the first connection electrode CNE1 may be located on the third intermediate insulation layer 30. The fourth intermediate insulation layer 40 may be a single-layered silicon oxide layer. A fifth intermediate insulation layer 50 may be located on the fourth intermediate insulation layer 40. The fifth intermediate insulation layer 50 may be an organic layer.

A second connection electrode CNE2 may be located on the fifth intermediate insulation layer 50. The second connection electrode CNE2 may be coupled to the first connection electrode CNE1 through a contact hole CNT-2 that penetrates the fourth and fifth intermediate insulation layers 40 and 50.

A sixth intermediate insulation layer 60 covering the second connection electrode CNE2 may be located on the fifth intermediate insulation layer 50. The sixth intermediate insulation layer 60 may be an organic layer. A first electrode AE is located on the sixth intermediate insulation layer 60. The first electrode AE is connected to the second connection electrode CNE2 through a contact hole CNT-3 that penetrates the sixth intermediate insulation layer 60. A first opening OP is defined in a pixel definition layer PDL. The first opening OP of the pixel definition layer PDL exposes at least a portion of the first electrode AE.

As shown in FIG. 5, the display area DA may include a pixel area PXA and a light-shield area NPXA adjacent to the pixel area PXA. The light-shield area NPXA may enclose the pixel area PXA. In some embodiments, the pixel area PXA is defined to correspond to a portion of the first electrode AE that is exposed to the first opening OP.

A hole control layer HCL may be located in common on the pixel area PXA and the light-shield area NPXA. The hole control layer HCL may include a hole transport layer, and may further include a hole injection layer. An emission layer EML is located on the hole control layer HCL. The emission layer EML may be located on a region that corresponds to the opening OP. For example, the emission layer EML may be formed on each of pixels (see PX of FIG. 4).

An electron control layer ECL is located on the emission layer EML. The electron control layer ECL may include an electron transport layer, and may further include an electron injection layer. An open mask may be used such that the hole control layer HCL and the electron control layer ECL are formed in common on a plurality of pixels PX. A second electrode CE is located on the electron control layer ECL. The second electrode CE has a unitary shape, and is located on a plurality of pixels PX.

The insulation layer TFE is located on the second electrode CE. According to some embodiments of the present disclosure, the insulation layer TFE may include a plurality of thin layers.

Figure 6:
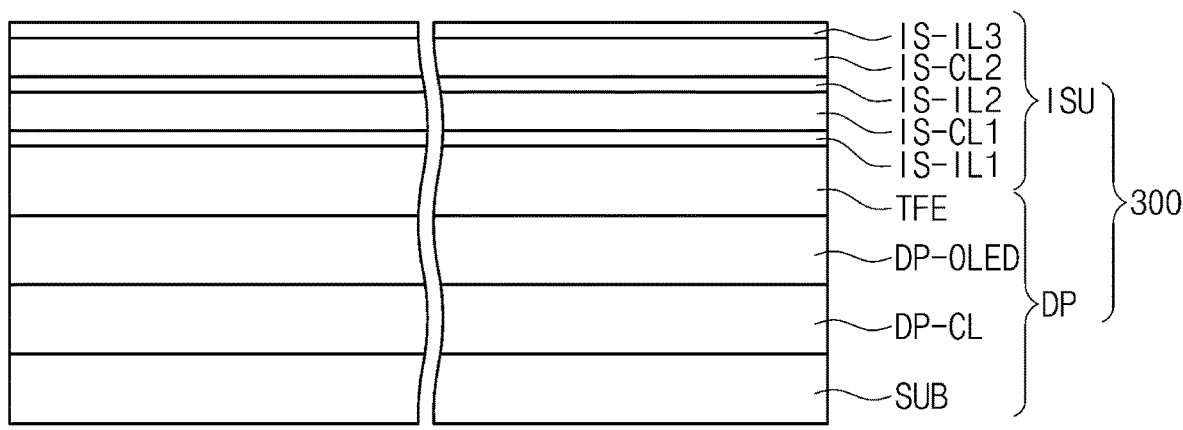
FIG. 6 illustrates a cross-sectional view showing a display module according to some embodiments of the present disclosure.

FIG. 6 illustrates a cross-sectional view showing a display module according to some embodiments of the present disclosure.

Referring to FIG. 6, the input sensing layer ISU may be directly located on the display panel DP. For example, the input sensing layer ISU may be formed on the display panel DP without an adhesive layer therebetween.

For example, the input sensing layer ISU may include a first sensing insulation layer IS-IL1, a first conductive layer IS-CL1, a second sensing insulation layer IS-IL2, a second conductive layer IS-CL2, and a third sensing insulation layer IS-IL3. The first sensing insulation layer IS-IL1 may be directly located on the insulation layer TFE. The technical concepts of the present disclosure, however, are not limited thereto. The first sensing insulation layer IS-IL1 may be omitted, and in this case the first conductive layer IS-CL1 may be directly located on the insulation layer TFE.

Each of the first and second conductive layers IS-CL1 and IS-CL2 may have either a single-layered structure or a multi-layered structure in which a plurality of layers are stacked along the third direction DR3. The multi-layered conductive layer may include two or more selected from transparent conductive layers and metal layers. The multi-layered conductive layer may include metal layers including different metals. The transparent conductive layer may include indium tin oxide (ITO), indium zinc oxide (IZO), zinc oxide (ZnO), indium tin zinc oxide (ITZO), PEDOT, metal nano-wires, or graphene. The metal layer may include molybdenum, silver, titanium, copper, aluminum, or any alloy thereof. For example, each of the first and second conductive layers IS-CL1 and IS-CL2 may have a tri-layered metallic structure, such as a stack of titanium/aluminum/titanium. The tri-layered metallic structure may be configured such that an outer layer includes metal with high durability and low reflectance, and that an inner layer includes metal with high electrical conductivity.

According to some embodiments of the present disclosure, each of the first and second conductive layers IS-CL1 and IS-CL2 may include a plurality of conductive patterns. The following will discuss an example in which the first conductive layer IS-CL1 includes first conductive patterns and the second conductive layer IS-CL2 includes second conductive patterns. The first conductive patterns may include sensing electrodes and signal lines connected to the sensing electrodes, and this description may also be applicable to the second conductive patterns.

Each of the first to third sensing insulation layers IS-IL1 to IS-IL3 may include an inorganic layer or an organic layer. In some embodiments, each of the first and second sensing insulation layers IS-IL1 and IS-IL2 may include an inorganic layer. The inorganic layer may include at least one selected from aluminum oxide, titanium oxide, silicon oxide, silicon oxynitride, zirconium oxide, and hafnium oxide. The third sensing insulation layer IS-IL3 may include an organic layer. The organic layer may include at least one selected from an acryl-based resin, methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 7:
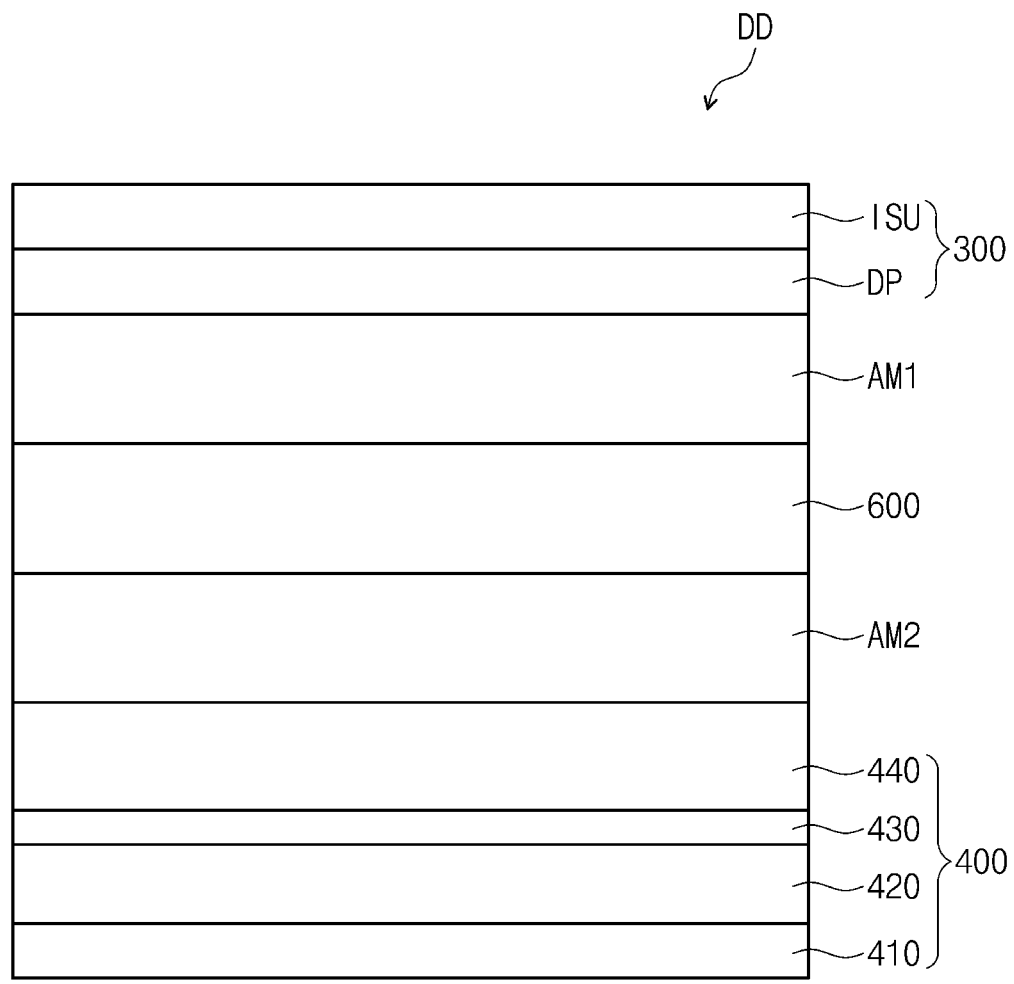
FIG. 7 illustrates a cross-sectional view showing a display device according to some embodiments of the present disclosure.
Figure 7:
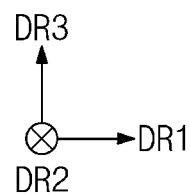

FIG. 7 illustrates a cross-sectional view showing a display device according to some embodiments of the present disclosure.

Referring to FIG. 7, the display device DD may include the display module 300 and the optical sensor 400, and may further include an infrared filter 600 and adhesive layers AM1 and AM2.

The adhesive layers AM1 and AM2 include a first adhesive layer AM1 located between the display module 300 and the infrared filter 600, and may also include a second adhesive layer AM2 located between the infrared filter 600 and the optical sensor 400. According to some embodiments of the present disclosure, the first and second adhesive layers AM1 and AM2 may each be an optically transparent adhesive member, and may each include an ordinary adhesive or glue.

The optical sensor 400 may include a base layer 410, a sensing layer 420, an etch stop layer 430, and an optical pattern layer 440. The optical sensor 400 may detect the user's fingerprint FP discussed with reference to FIG. 1. The optical sensor 400 may detect light reflected from the user's fingerprint FP and may obtain user's biometric information. Light irradiated on the user's fingerprint FP may be emitted through the emission layer EML of the display panel DP shown in FIG. 5. The light emitted through the emission layer EML may be reflected from the user's fingerprint FP, and may then be transmitted to the optical sensor 400.

For example, the base layer 410 may include a synthetic resin layer. The synthetic resin layer may include a thermosetting resin. For example, the synthetic resin layer may be a polyimide-based resin layer, but the material of the synthetic resin layer is not particularly limited. In some embodiments, the base layer 410 may include two polyimide-based resin layers and a barrier layer between the polyimide-based resin layers. The barrier layer may include amorphous silicon and silicon oxide.

The sensing layer 420 may be located on the base layer 410. The sensing layer 420 may include a plurality of sensing elements and a plurality of insulation layers. Each of the sensing elements may include at least one transistor and at least one photodiode.

The etch stop layer 430 may be located on the sensing layer 420 and may entirely cover the sensing elements. According to some embodiments of the present disclosure, the etch stop layer 430 may be a protective layer to protect the sensing layer 420. For example, the etch stop layer 430 may prevent the sensing layer 420 from being damaged due to an etching gas that occurs in an etching process in which the optical pattern layer 440 is formed. The etch stop layer 430 may include an inorganic material, such as at least one selected from silicon oxide and silicon oxynitride.

The optical pattern layer 440 may be directly located on the etch stop layer 430 and may filter light that is incident on the sensing layer 420. For example, the optical pattern layer 440 may control an incident angle of light that can pass therethrough. The incident angle may be limited to a range to be equal to, or less than, a certain angle. The limitation of the incident angle may increase accuracy of fingerprint recognition. The optical pattern layer 440, the sensing layer 420, and the etch stop layer 430 may be formed together with each other in a successive process(es).

In some other embodiments of the present disclosure, when the etch stop layer 430 of FIG. 7 is omitted, the optical pattern layer 440 may be directly located on the sensing layer 420. In this case, the sensing layer 420 and the optical pattern layer 440 may be formed in a successive process(es).

The infrared filter 600 may be a filter that blocks transmission of infrared light and allows transmission of visible light. The light reflected from the user's fingerprint FP may be visible light. According to some embodiments of the present disclosure, the infrared filter 600 may transmit light with a first wavelength range that is reflected from the user's fingerprint FP, but may shield light whose wavelength range is different from the first wavelength range. As a result, the sensing layer 420 may increase in accuracy of fingerprint recognition. The infrared filter 600 may be connected through the first adhesive layer AM1 to the display module 300, and connected through the second adhesive layer AM2 to the optical sensor 400.

Figure 8A:
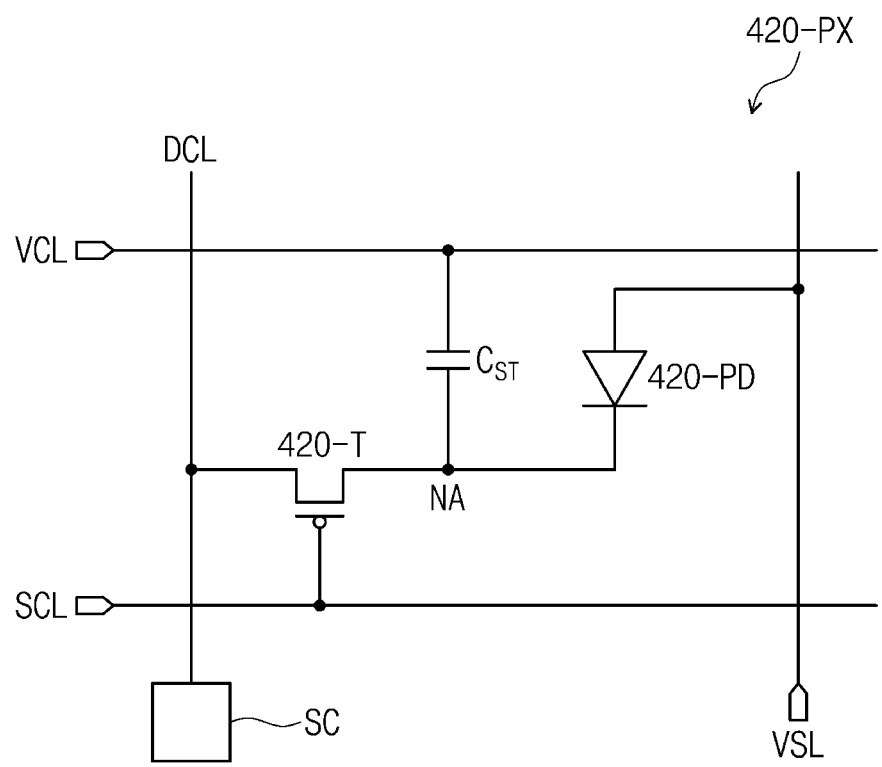
FIG. 8A illustrates a circuit diagram showing a sensing layer of FIG. 7 according to some embodiments of the present disclosure.
Figure 8B:
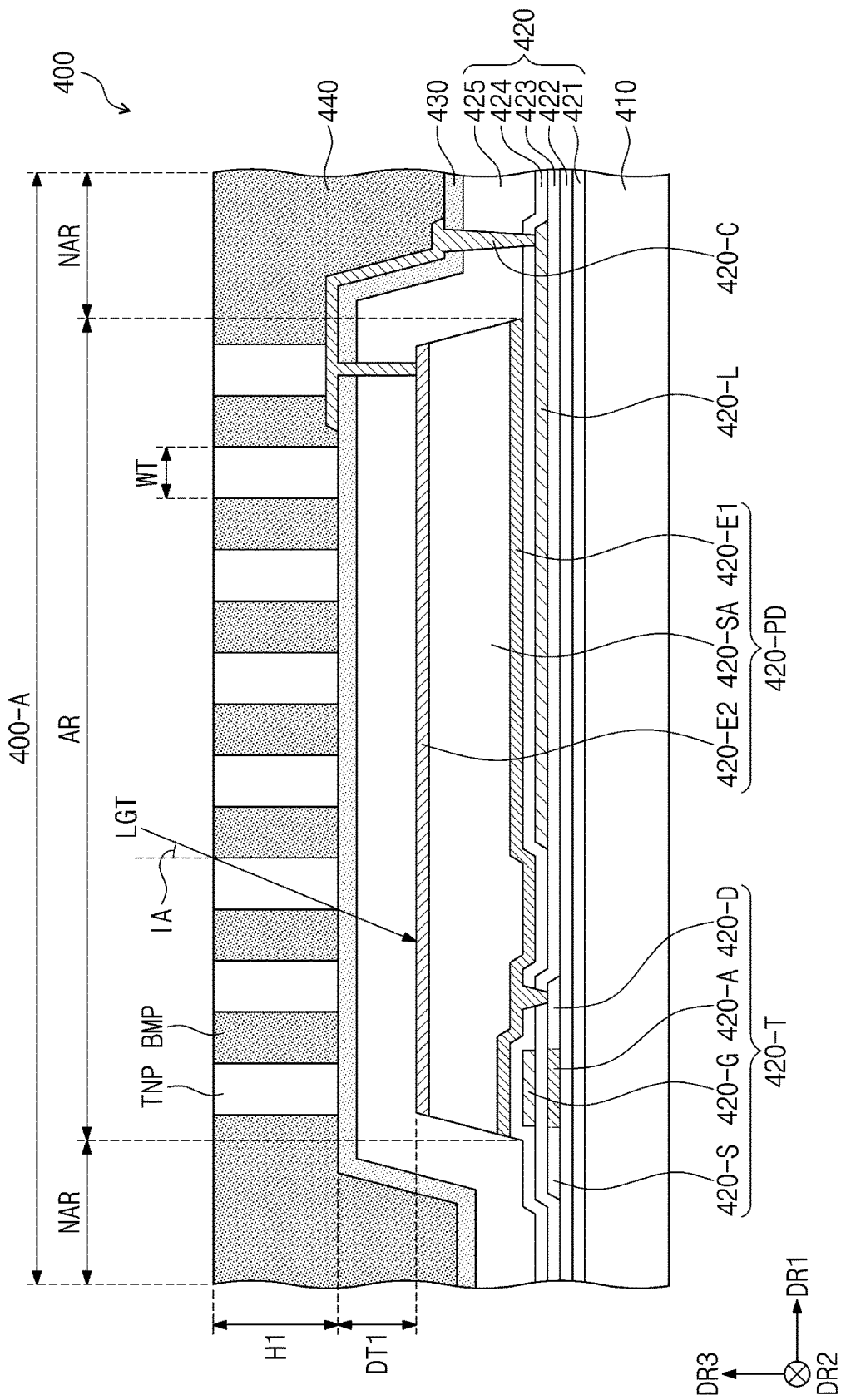
FIG. 8B illustrates a cross-sectional view showing an optical sensor of FIG. 7 according to some embodiments of the present disclosure.
Figure 9:
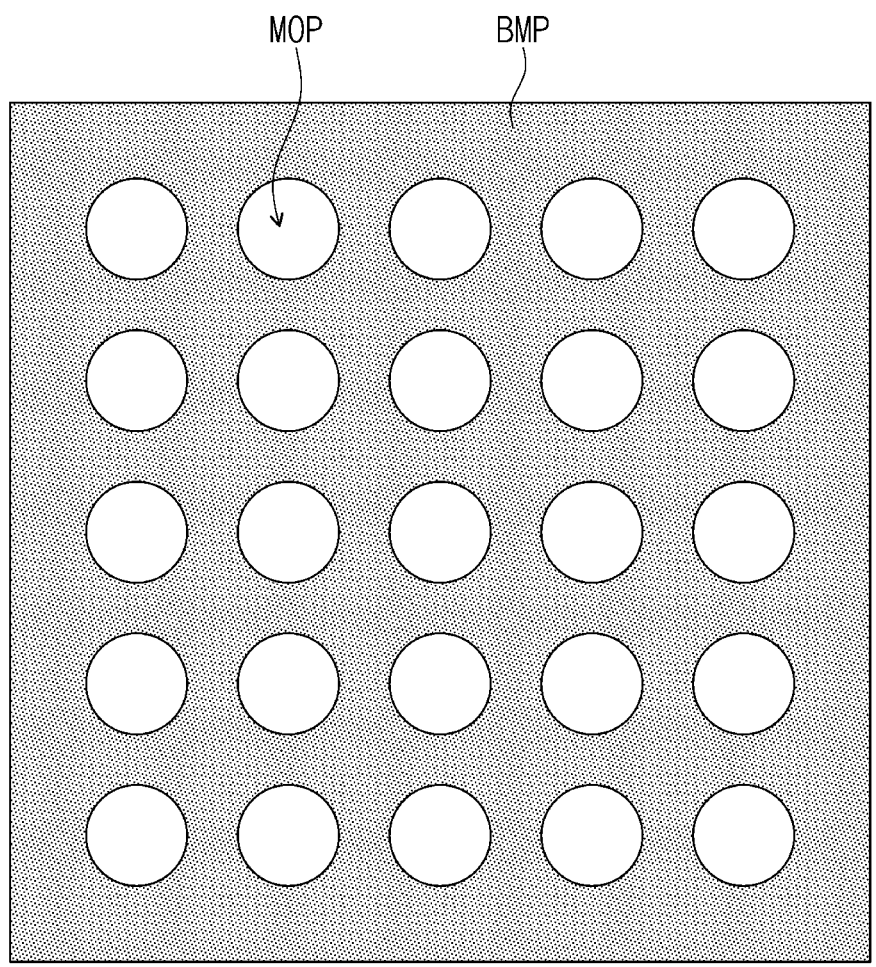
FIG. 9 illustrates a plan view showing a light-shield section of an optical pattern layer according to some embodiments of the present disclosure.

FIG. 8A illustrates a circuit diagram showing the sensing layer of FIG. 7 according to some embodiments of the present disclosure, FIG. 8B illustrates a cross-sectional view showing the optical sensor of FIG. 7 according to some embodiments of the present disclosure, and FIG. 9 illustrates a plan view showing a light-shield section of the optical pattern layer according to some embodiments of the present disclosure. With reference to FIGS. 8A and 8B, described in detail below is a structure of the sensing layer 420 and the optical pattern layer 440 included in the optical sensor 400 shown in FIG. 7.

The optical sensor 400 illustrated in FIGS. 8A and 8B includes the detection area 400-A and the non-detection area 400-N discussed above with reference to FIG. 2. For example, the detection area 400-A includes a plurality of sensing areas AR and a non-sensing area NAR that encloses the plurality of sensing areas AR when viewed in a plan view. A sensing pixel 420-PX may be located on each of the sensing areas AR. For convenience of description, with reference to FIGS. 8A and 8B, the following will focus on the sensing pixel 420-PX located on one of the plurality of sensing areas AR included in the detection area 400-A.

Referring to FIG. 8A, the sensing pixel 420-PX includes a third transistor 420-T, a sensing element 420-PD, a sensing capacitor Cst, a first sensing line SCL, a second sensing line DCL, a third sensing line VCL, and a fourth sensing line VSL. A sensing circuit SC may be connected to the second sensing line DCL of the sensing pixel 420-PX, and in response to a sensing signal output from the sensing pixel 420-PX, the sensing circuit SC may obtain the user's biometric information.

The third transistor 420-T includes a control electrode connected to the first sensing line SCL, a first switch electrode connected to the second sensing line DCL, and a second switch electrode connected to the sensing element 420-PD. The third transistor 420-T may operate in response to a scan signal output from the first sensing line SCL.

The sensing capacitor Cst may be formed between the third sensing line VCL and a common node NA. The sensing capacitor Cst may have capacitance that is determined based on a common voltage applied from the third sensing line VCL and based on a node voltage of the common node NA. The common node NA may be a node that divides the sensing element 420-PD, the third transistor 420-T, and the sensing capacitor Cst from each other.

When no light irradiation occurs, the sensing element 420-PD acts as an insulator, but when the light irradiation is performed, the sensing element 420-PD acts as a conductor such that its electrical property is changed to have electrical connections at its opposite ends. For example, the sensing element 420-PD may be a photonic sensor. An end of the sensing element 420-PD is connected to the fourth sensing line VSL, and another end of the sensing element 420-PD is connected to the common node NA. The end of the sensing element 420-PD may receive a bias signal through the fourth sensing line VSL, and the other end of the sensing element 420-PD may receive a signal that is applied to the common node NA.

When the sensing element 420-PD is irradiated with external light, the sensing element 420-PD may output photocurrent in response to the external light. Accordingly, the photocurrent that is output to the common node NA may change capacitance of the sensing capacitor Cst. When a low signal is applied to the control electrode of the third transistor 420-T, the first and second switch electrodes of the third transistor 420-T may be electrically connected to each other. As a result, the sensing circuit SC may sense an electric current through the third transistor 420-T output from the sensing capacitor Cst, and thus may obtain the user's biometric information.

Referring to FIG. 8B, a barrier layer 421 may be located on the base layer 410. A sensor buffer layer 422 may be located on the barrier layer 421.

The barrier layer 421 reduces or prevents the likelihood of introduction of foreign substances from outside. The barrier layer 421 may include at least one selected from a silicon oxide layer and a silicon nitride layer. Each of the silicon oxide layer and the silicon nitride layer may be provided in plural, and the silicon oxide layers and the silicon nitride layers may be alternately stacked on one another.

The sensor buffer layer 422 increases a bonding force between the base layer 410 and at least one selected from a semiconductor pattern and a conductive pattern. The sensor buffer layer 422 may include at least one selected from a silicon oxide layer and a silicon nitride layer. The silicon oxide layer and the silicon nitride layer may be alternately stacked.

The third transistor 420-T may be located on the sensor buffer layer 422. The third transistor 420-T may include a third active region 420-A, a third source region 420-S, a third drain region 420-D, and a third gate 420-G. The third active region 420-A, the third source region 420-S, and the third drain 420-D may be located on the sensor buffer layer 422.

A first insulation layer 423 is located on the sensor buffer layer 422 and covers the third active region 420-A, the third source region 420-S, and the third drain region 420-D. The first insulation layer 423 may be an inorganic layer and/or an organic layer, and may have a single-layered or multi-layered structure. In some embodiments, the first insulation layer 423 may be a single-layered silicon oxide layer.

The third gate 420-G and a wiring layer 420-L may be located on the first insulation layer 423. The wiring layer 420-L may receive a certain voltage, for example, a bias voltage. The wiring layer 420-L may be electrically connected to the sensing element 420-PD, and may correspond to the fourth sensing line VSL shown in FIG. 8A.

A second insulation layer 424 is located on the first insulation layer 423 and covers the third gate 420-G and the wiring layer 420-L. The second insulation layer 424 may be an inorganic layer and may have a single-layered or multi-layered structure. In some embodiments, the second insulation layer 424 may be a single-layered silicon oxide layer.

The sensing element 420-PD may be located on the second insulation layer 424. The sensing element 420-PD may be electrically connected to the third transistor 420-T and the wiring layer 420-L. For example, the sensing element 420-PD may be operationally controlled by a signal provided from the third transistor 420-T, and may receive a certain voltage from the wiring layer 420-L.

The sensing element 420-PD may include a first sensing electrode 420-E1, a sensing part 420-SA, and a second sensing electrode 420-E2.

The first sensing electrode 420-E1 may penetrate the first and second insulation layers 423 and 424 and may have an electrical connection with the third drain area 420-D of the third transistor 420-T. The first sensing electrode 420-E1 may include an opaque conductive material. For example, the first sensing electrode 420-E1 may include molybdenum (Mo).

The sensing part 420-SA may be located on the first sensing electrode 420-E1. The sensing part 420-SA may include amorphous silicon.

The second sensing electrode 420-E2 may be located on the sensing part 420-SA. The second sensing electrode 420-E2 may include a transparent conductive material. For example, the second sensing electrode 420-E2 may include indium tin oxide (ITO).

A third insulation layer 425 may be located on the second sensing electrode 420-E2. The third insulation layer 425 may be an inorganic layer and may have a single-layered or multi-layered structure. For example, the third insulation layer 425 may include a silicon oxide layer and a silicon nitride layer.

A connection electrode 420-C may be located on the third insulation layer 425. The connection electrode 420-C may penetrate the third insulation layer 425 and may have an electrical connection with the second sensing electrode 420-E2. In addition, the connection electrode 420-C may penetrate the second and third insulation layers 424 and 425 and may have an electrical connection with the wiring layer 420-L.

The etch stop layer 430 may be located on the third insulation layer 425 and may be provided as an inorganic layer. For example, the etch stop layer 430 may entirely overlap the third insulation layer 425. As a result, the etch stop layer 430 may prevent the sensing layer 420 from being damaged due to an etching gas that occurs in an etching process in which the optical pattern layer 440 is formed.

Although the etch stop layer 430 is discussed to entirely overlap the third insulation layer 425, the present disclosure is not necessarily limited thereto. For example, the etch stop layer 430 may be formed to entirely overlap the sensing area AR, which will be discussed below, and to partially overlap the non-sensing area NAR, which will be discussed below.

Moreover, as shown in FIG. 8B, the etch stop layer 430 may be formed to have a thickness in the third direction DR3 that is less than a thickness of the third insulation layer 425, which is provided as an inorganic layer, in the third direction DR3. Also, the etch stop layer 430 may be formed to have a thickness in the third direction DR3 that is less than a thickness of the optical pattern layer 440, which is provided as an organic layer, in the third direction DR3.

The optical pattern layer 440 may be directly located on the etch stop layer 430. According to some embodiments of the present disclosure, the optical pattern layer 440, the sensing layer 420, and the etch stop layer 430 may be formed together with each other in a successive process. As discussed above, as the optical pattern layer 440 is formed directly on the etch stop layer 430 without a separate adhesive layer therebetween, the display device DD may decrease in overall thickness.

According to some embodiments of the present disclosure, the optical pattern layer 440 may be an organic layer, and may include a plurality of transmission sections TNP and a light-shield section BMP. The transmission sections TNP may have optical transparency, and may include a first organic material allowing transmission of light LGT reflected from the user's fingerprint FP of FIG. 1. The light LGT reflected from the user's fingerprint FP may pass through the transmission sections TNP and may then be incident on the sensing element 420-PD.

Further, in some embodiments, the transmission sections TNP overlapping the sensing area AR may overlap the light-shield area NPXA shown in FIG. 5. For example, light that has passed through the light-shield area NPXA may be incident on the transmission sections TNP.

The light-shield section BMP may have a property to absorb light, and may include a second organic material to absorb the light LGT reflected from the user's fingerprint FP. The light-shield section BMP may entirely overlap the non-sensing area NAR, and may partially overlap the sensing area AR.

According to that shown in FIG. 9, the light-shield section BMP may have a plurality of second openings MOP defined therein, and the transmission sections TNP may be located in corresponding second openings MOP. For example, the light-shield section BMP according to the present disclosure may not overlap the transmission sections TNP. The second openings MOP may be arranged in the first direction DR1 at a regular interval, and may be arranged in the second direction DR2 at a regular interval. For example, the second openings MOP may each be shaped like a through hole that penetrates top and bottom surfaces of the optical pattern layer 440. Accordingly, the transmission sections TNP located in the second openings MOP may have their top and bottom surfaces that are externally exposed.

In addition, when viewed in a plan view as shown in FIG. 9, the light-shield section BMP according to the present disclosure may enclose the transmission sections TNP, and may have a planar area that is greater than that of the transmission sections TNP.

Referring back to FIG. 8B, the transmission sections TNP may entirely overlap the sensing area AR. The transmission sections TNP may each have a first height H1 in the third direction DR3, and may be arranged at a regular interval on the etch stop layer 430. For example, the transmission sections TNP may be located in the second openings MOP shown in FIG. 9. The light-shield section BMP overlapping the sensing area AR may have a height that corresponds to the first height H1 of each of the transmission sections TNP.

Conventionally, when the light LGT reflected from the user's fingerprint FP has an incident angle IA that is greater than a certain angle, the sensing element 420-PD may receive not only light reflected from a valley of the fingerprint FP that corresponds to the sensing element 420-PD, but may also receive light reflected from another valley adjacent to the valley. This may reduce accuracy of fingerprint recognition.

According to some embodiments of the present disclosure, the optical pattern layer 440 may impose a limitation on the incident angle IA of the light LGT that can pass through the optical pattern layer 440. For example, the light LGT may be incident on the sensing element 420-PD through the transmission sections TNP of the optical pattern layer 440, but the light LGT may be instead absorbed by the light-shield section BMP. Therefore, the optical pattern layer 440 may compel the sensing element 420-PD to receive light that is incident at an angle that is equal to or less than the incident angle IA. Accordingly, the fingerprint recognition may increase in accuracy or sensitivity.

The maximum incident angle IA may be determined in consideration of a half pitch of the fingerprint FP and of an interval distance between the optical pattern layer 440 and an outermost surface of the display device (e.g., see display device DD of FIG. 1). For example, the pitch of the fingerprint FP may be defined as a distance between two valleys adjacent to each other, or a distance between two ridges adjacent to each other. The pitch of the user's fingerprint FP may typically range from about 400 micrometers to about 600 micrometers. The interval distance may be a gap between the top surface of the optical pattern layer 440 and the top surface of the window (e.g., see the window 100 of FIG. 2). As such, an angle may be established as design conditions in consideration of the pitch of the fingerprint FP and the interval distance. For example, the incident angle IA may be controlled by a ratio between a width WT of each of the transmission sections TNP and the first height H1 of the light-shield section BMP overlapping the sensing area AR.

In some embodiments of the present disclosure, a distance (e.g., a minimum distance) DT1 between the light-shield section BMP and the sensing element 420-PD may range between about 1 micrometer and about 5 micrometers. The minimum distance DT1 may be a gap between a lowermost surface of the light-shield section BMP overlapping the sensing area AR and an uppermost surface of a component located at the top of the sensing element 420-PD. For example, the minimum distance DT1 may indicate a distance between the light-shield section BMP and the second sensing electrode 420-E2 of the sensing element 420-PD. The lowest limit of the minimum distance DT1 is not limited to the example mentioned above.

When the minimum distance DT1 is greater than about 5 micrometers, interference may occur between lights that have passed through the optical pattern layer 440, which may result in a reduction in sensitivity of fingerprint recognition. For example, the minimum distance DT1 may be determined to have a range between about 2.5 micrometers and about 2.8 micrometers. The minimum distance DT1, however, is not limited to the values described above.

According to the description above, the optical pattern layer 440 including the transmission sections TNP and the light-shield section BMP may not only serve as an organic layer at the top of the optical sensor 400, but may also control a pathway of the light LGT reflected from the fingerprint FP. That is, as the optical pattern layer 440 is directly located on the etch stop layer 430 provided as an inorganic layer, a distance between the optical pattern layer 440 and the second sensing electrode 420-E2 may be reduced. In conclusion, it may be possible to prevent or reduce the interference between lights that have passed through the optical pattern layer 440, and thus to increase accuracy of fingerprint recognition.

Figure 10:
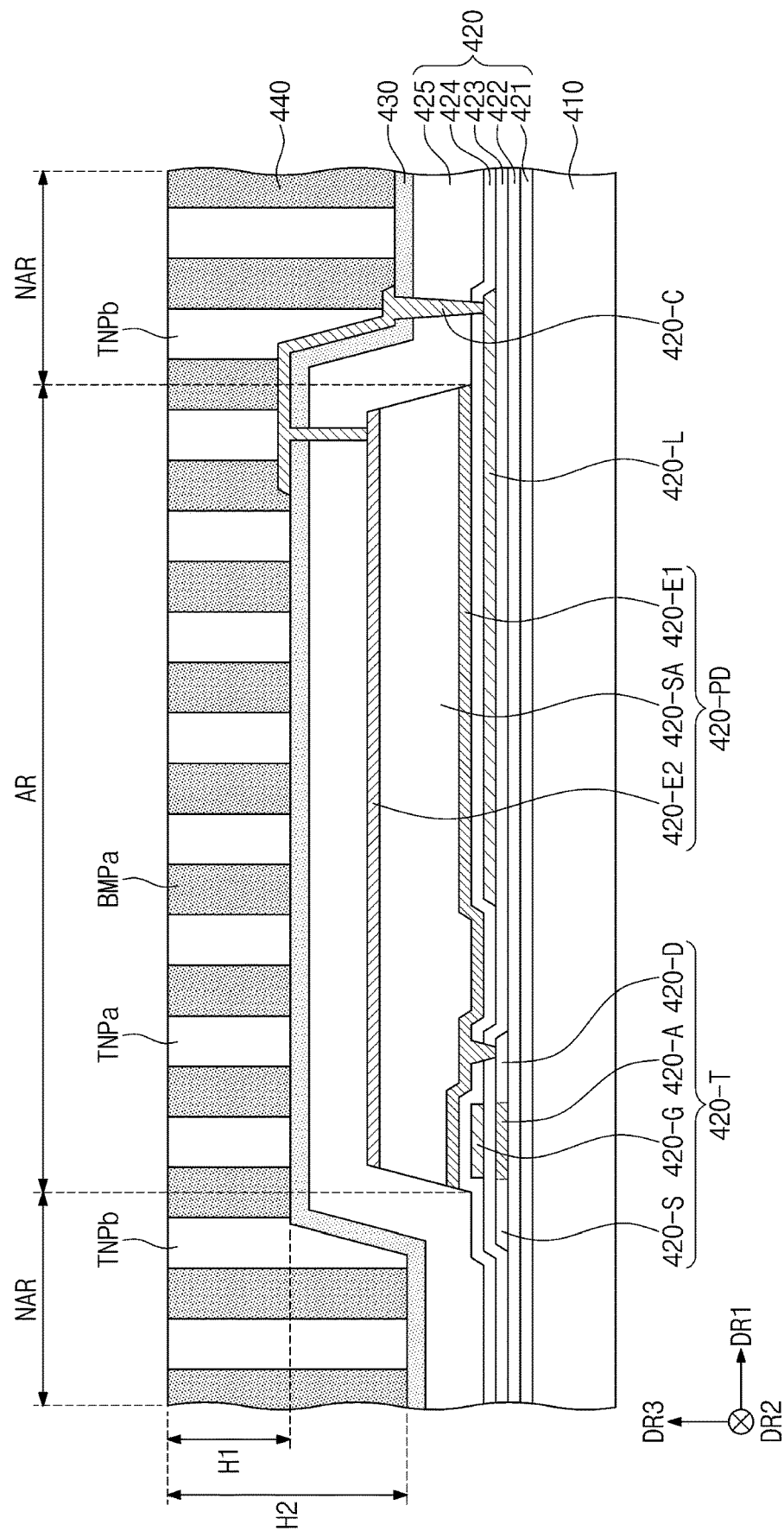
FIG. 10 illustrates a cross-sectional view showing an optical sensor of FIG. 7 according to some embodiments of the present disclosure.

FIG. 10 illustrates a cross-sectional view showing an optical sensor of FIG. 7 according to some embodiments of the present disclosure.

The optical pattern layer 440 shown in FIG. 10 may have substantially the same structure as that of the optical pattern layer 440 shown in FIG. 8B, except for the inclusion of both transmission sections TNPa overlapping the sensing area AR and transmission sections TNPb overlapping the non-sensing area NAR (e.g., the transmission sections TNPb may be included in, or referred to as, an auxiliary transmission section(s)).

Referring to FIG. 10, transmission sections TNPa and TNPb include first transmission sections TNPa that overlap the sensing area AR, and second transmission sections TNPb that overlap the non-sensing area NAR. Like the light-shield section BMP shown in FIG. 8B, a light-shield section BMPa may enclose the first transmission sections TNPa and the second transmission sections TNPb when viewed in a plan view.

The second transmission sections TNPb may be exposed to each of the top and bottom surfaces of the optical pattern layer 440.

According to some embodiments of the present disclosure, each of the second transmission sections TNPb that overlap the non-sensing area NAR may have a second height H2 that is greater than a first height H1 of the first transmission sections TNPa that overlap the sensing area AR. For example, as each of the second and third insulation layers 424 and 425 is provided as an inorganic layer, each of the first transmission sections TNPa may be formed to have a height different from that of the second transmission sections TNPb.

Figure 11A:
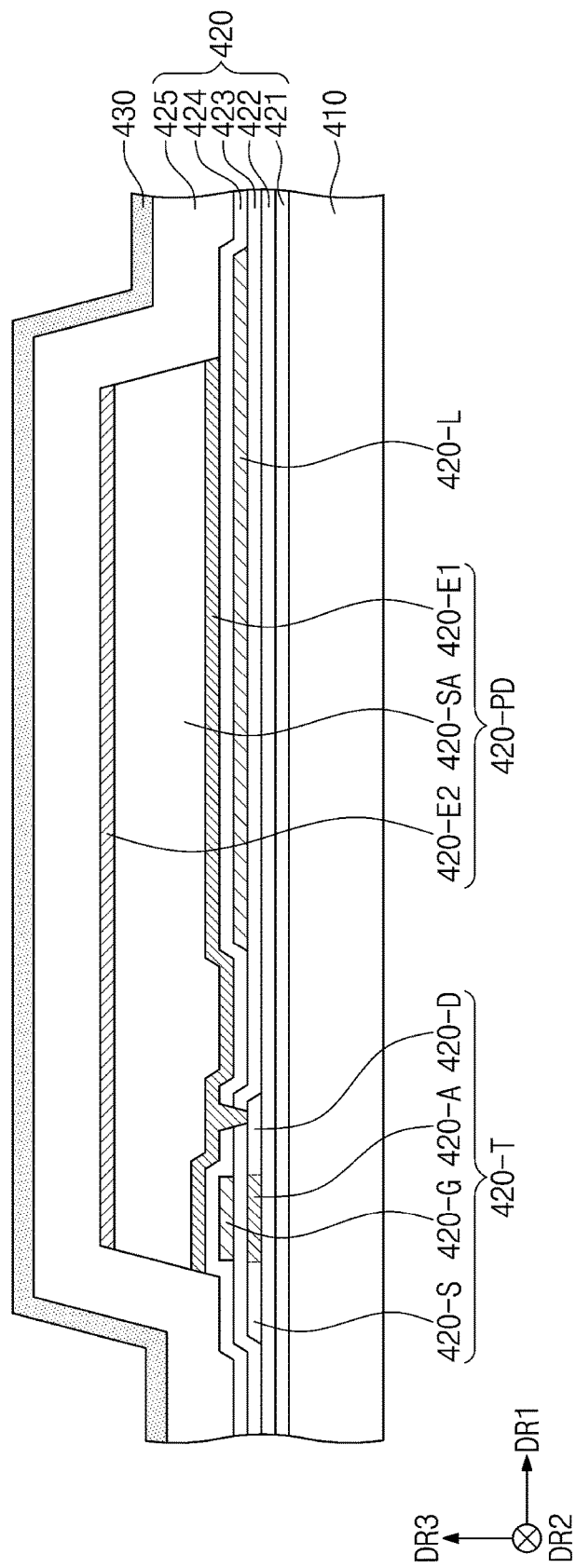
FIGS. 11A to 11G illustrate cross-sectional views showing a method of fabricating a display device according to some embodiments of the present disclosure.
Figure 11B:
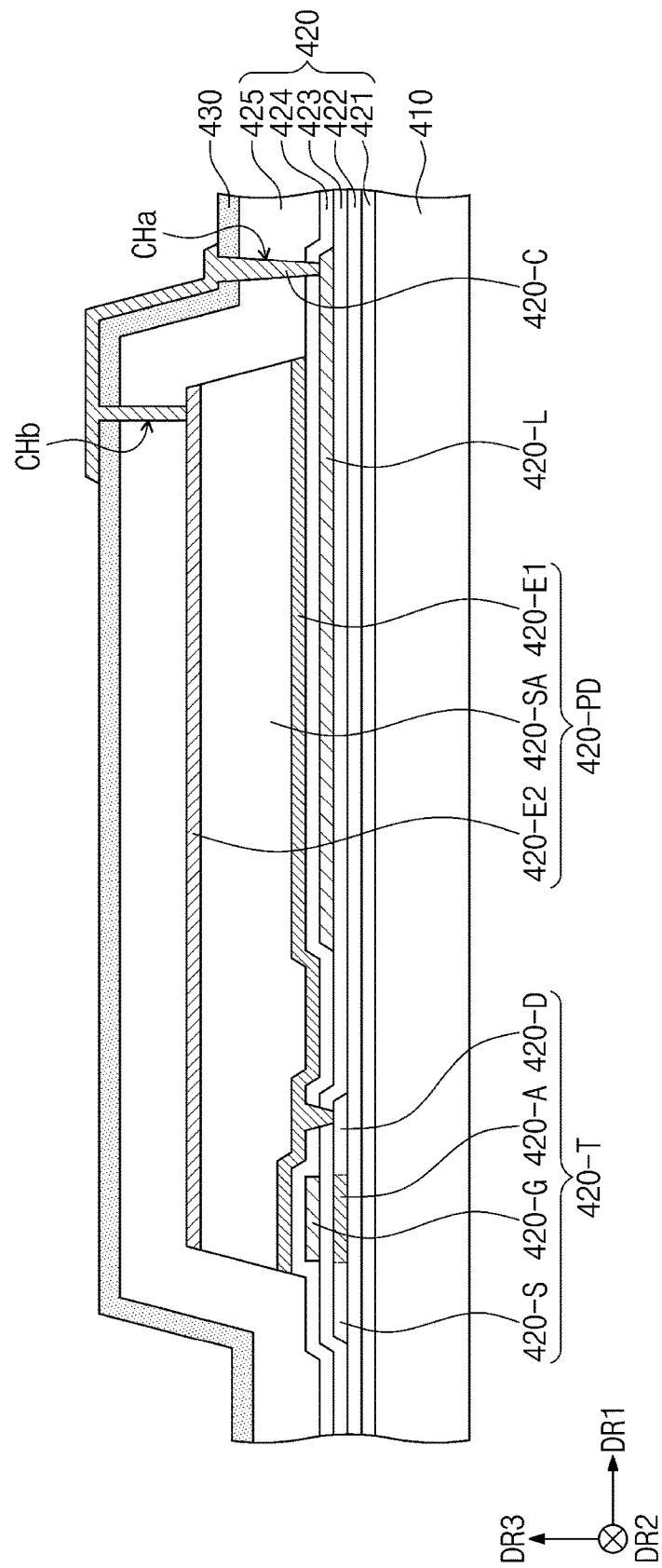

FIGS. 11A to 11G illustrate cross-sectional views showing a method of fabricating a display device according to some embodiments of the present disclosure. FIG. 11A shows a method of forming the etch stop layer 430 of the optical sensor 400, FIG. 11B shows a method of forming the connection electrode 420-C of the optical sensor 400, and FIGS. 11C to 11G show a method of forming the optical pattern layer 440 of the optical sensor 400.

Referring to FIG. 11A, there may be provided the base layer 410 and the sensing layer 420 formed on the base layer 410. For example, the optical pattern layer 440 may not be directly formed, but the etch stop layer 430 may be formed on the third insulation layer 425 at top of the sensing layer 420. The etch stop layer 430 according to the present disclosure may include an inorganic material, and may reduce or prevent the likelihood of damage to the sensing layer 420 due to an etching gas that occurs in an etching process in which the optical pattern layer 440 is formed.

Referring to FIG. 11B, the connection electrode 420-C may be formed on the etch stop layer 430. For example, the connection electrode 420-C may be connected to the wiring layer 420-L through a first through hole CHa that penetrates the etch stop layer 430, the third insulation layer 425, and the second insulation layer 424. In addition, the connection electrode 420-C may be connected to the second sensing electrode 420-E2 through a second through hole CHb that penetrates the etch stop layer 430 and the third insulation layer 425.

Figure 11C:
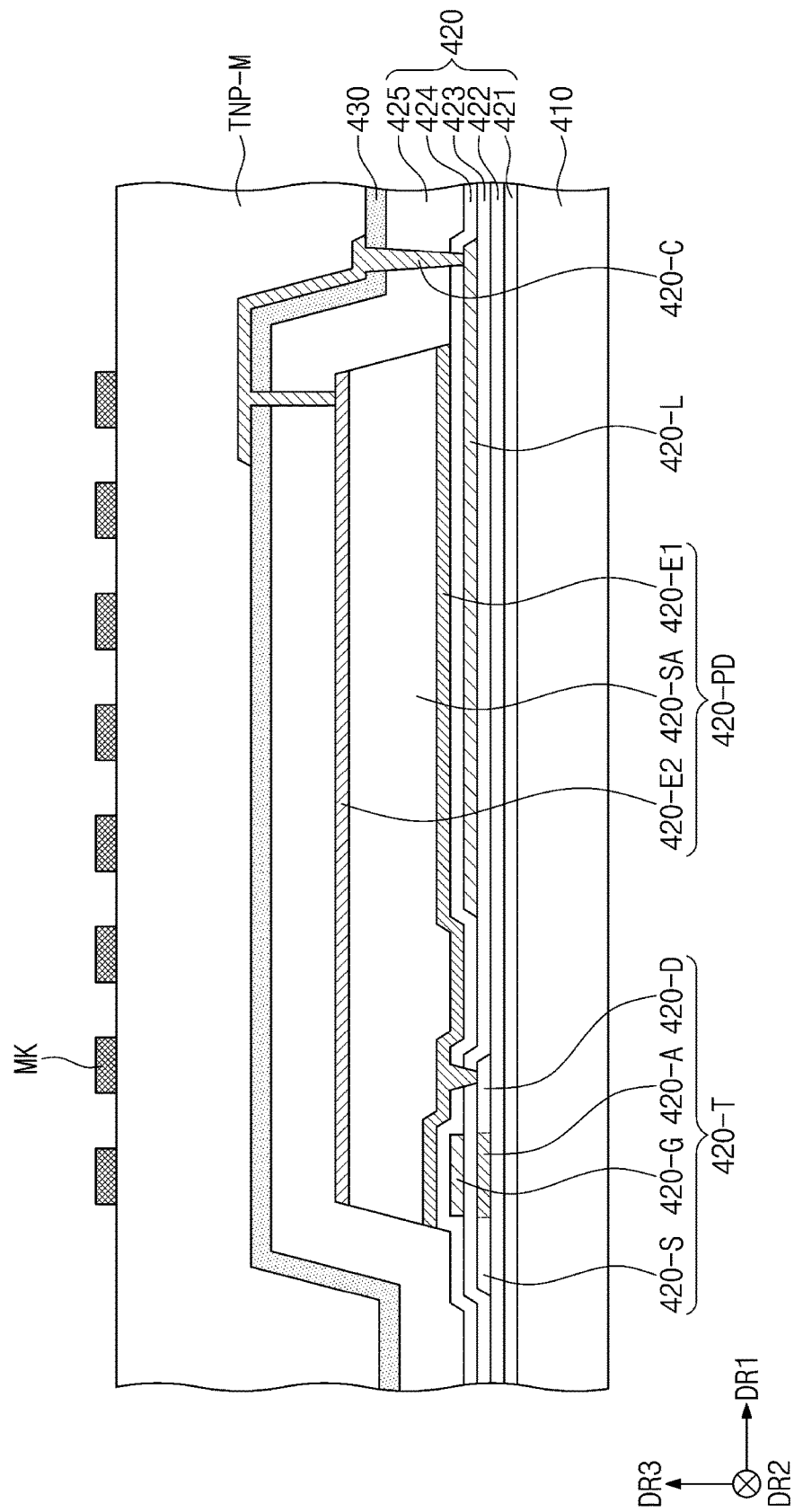

Referring to FIG. 11C, a transmission organic layer TNP-M may be formed on the etch stop layer 430. The transmission organic layer TNP-M may include an organic material allowing transmission of light reflected from the user's fingerprint (see FP of FIG. 1). Afterwards, mask patterns MK overlapping the sensing element 420-PD may be formed on the transmission organic layer TNP-M. For example, the mask patterns MK may be arranged at a regular interval on the transmission organic layer TNP-M. The mask patterns MK may be formed to have their shapes that correspond to those of a plurality of second openings MOP shown in FIG. 9.

Thereafter, an etching gas may be used to dry-etch the transmission organic layer TNP-M. In this case, the etching gas may etch regions of the transmission organic layer TNP-M that do not overlap the mask patterns MK, and thus a plurality of transmission sections TNP may be formed as shown in FIG. 11D.

According to some embodiments of the present disclosure, while the transmission organic layer TNP-M is etched with an etching gas, the etch stop layer 430 may protect, from the etching gas, the sensing element 420-PD of the sensing layer 420 and elements of the third transistor 420-T.

Figure 11D:
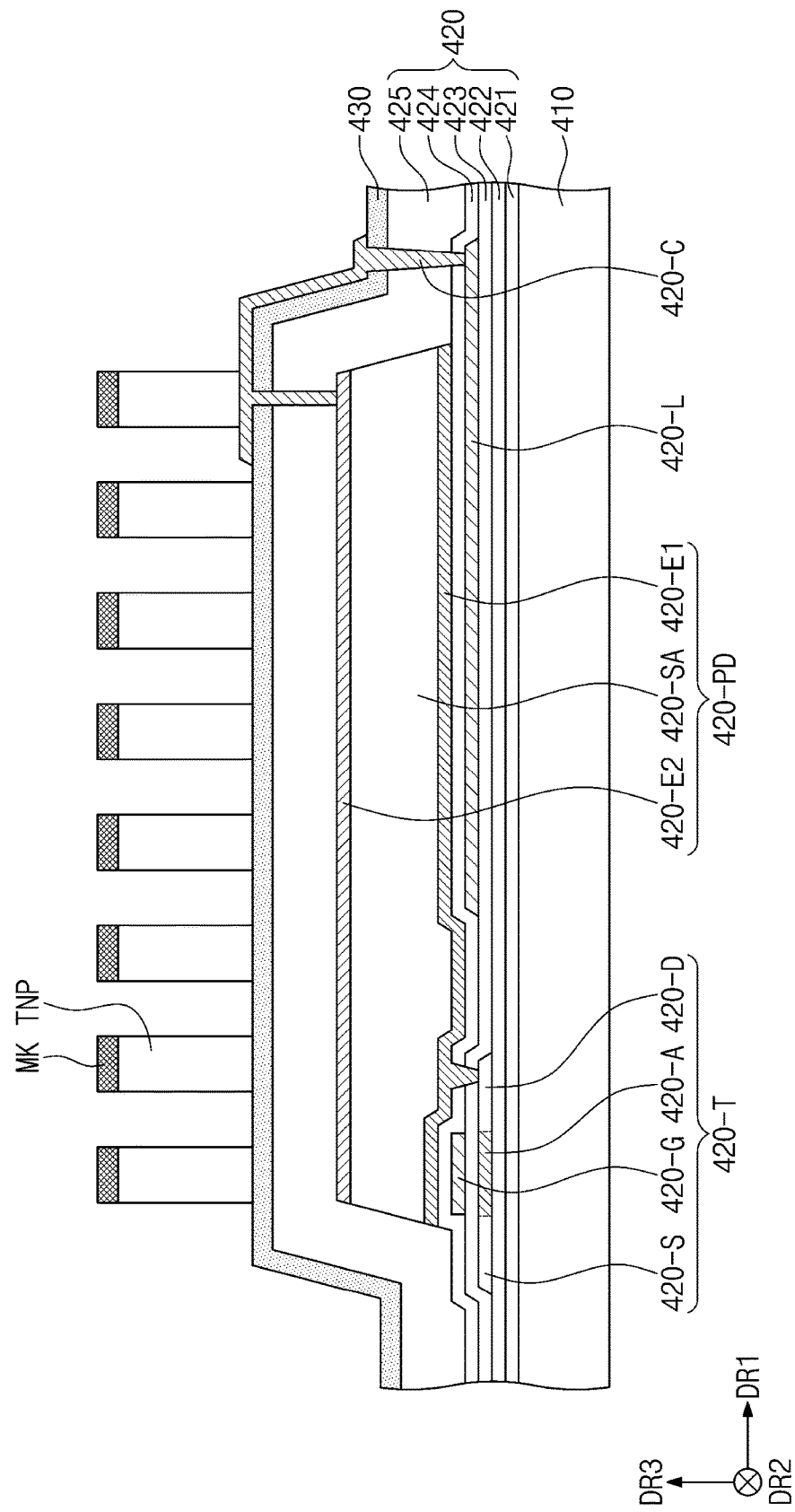

The transmission sections TNP of FIG. 11D are illustrated as being located to be confined on a region that overlaps the sensing element 420-PD, but the present disclosure is not necessarily limited thereto. For example, according to some other embodiments, one or more transmission sections may be formed on portions of the etch stop layer 430 that do not overlap the sensing element 420-PD.

Figure 11E:
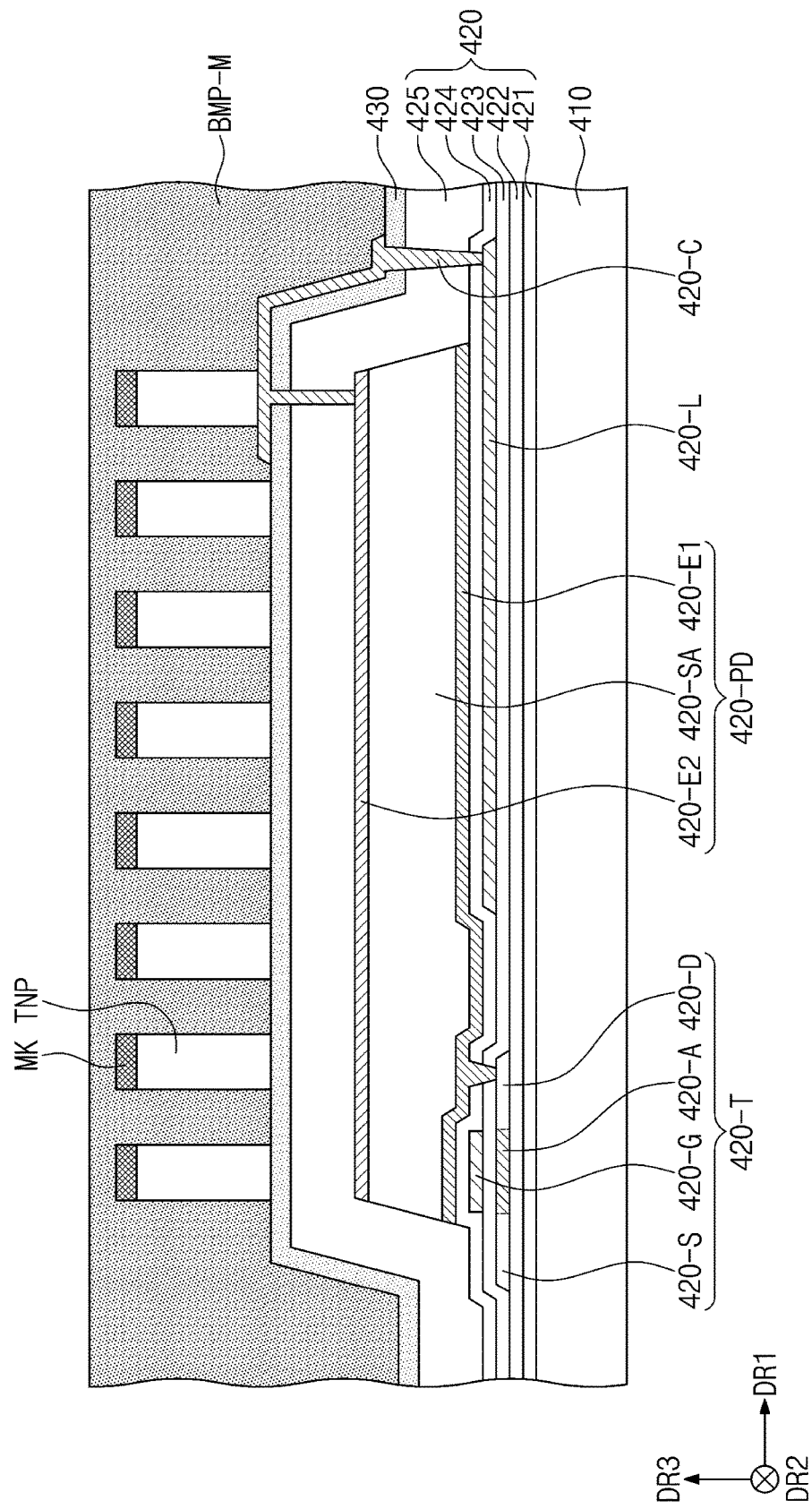

Referring to FIG. 11E, a light-shield organic layer BMP-M may be formed on the etch stop layer 430, while entirely covering the transmission sections TNP. In this case, the light-shield organic layer BMP-M prevents the transmission sections TNP from being externally visible.

Figure 11F:
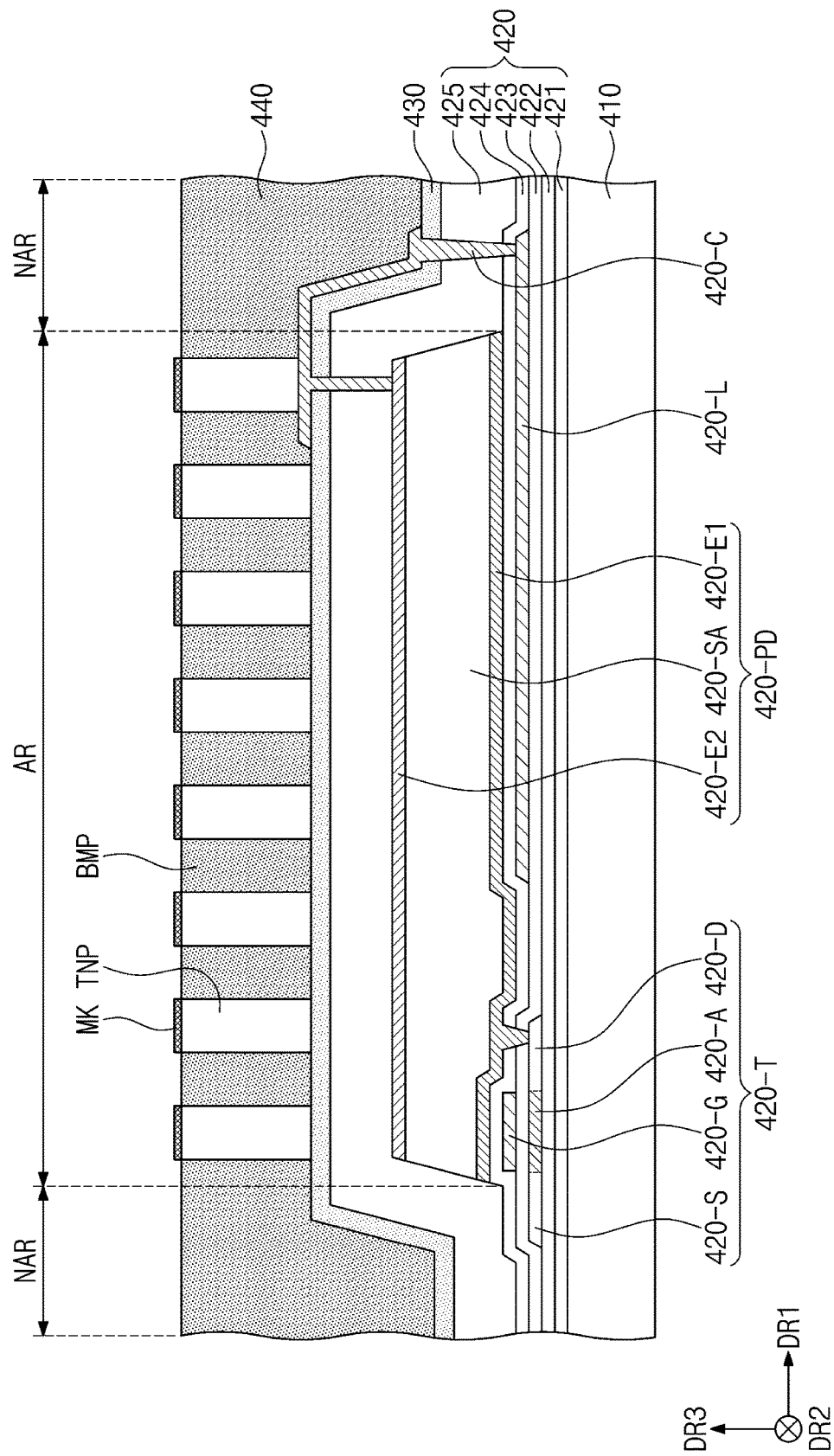

Afterwards, a top surface of the light-shield organic layer BMP-M may be patterned to externally expose the transmission sections TNP. For example, a chemical mechanical polishing process may be performed until the transmission sections TNP are exposed at the top surface of the light-shield organic layer BMP-M. For another example, a chemical mechanical polishing process may be performed until the mask patterns MK are exposed through the top surface of the light-shield organic layer BMP-M Therefore, as shown in FIG. 11F, the light-shield section BMP may externally expose the mask patterns MK. When a chemical mechanical polishing process removes or polishes the mask patterns MK, top surfaces of the transmission sections TNP may be externally exposed.

According to the description above, the optical pattern layer 440 may be formed to include the transmission sections TNP, and the light-shield section BMP that encloses the transmission sections TNP when viewed in a plan view.

Light reflected from the user's fingerprint (e.g., see fingerprint FP of FIG. 1) may be transmitted through the transmission sections TNP to the sensing element 420-PD.

Figure 11G:
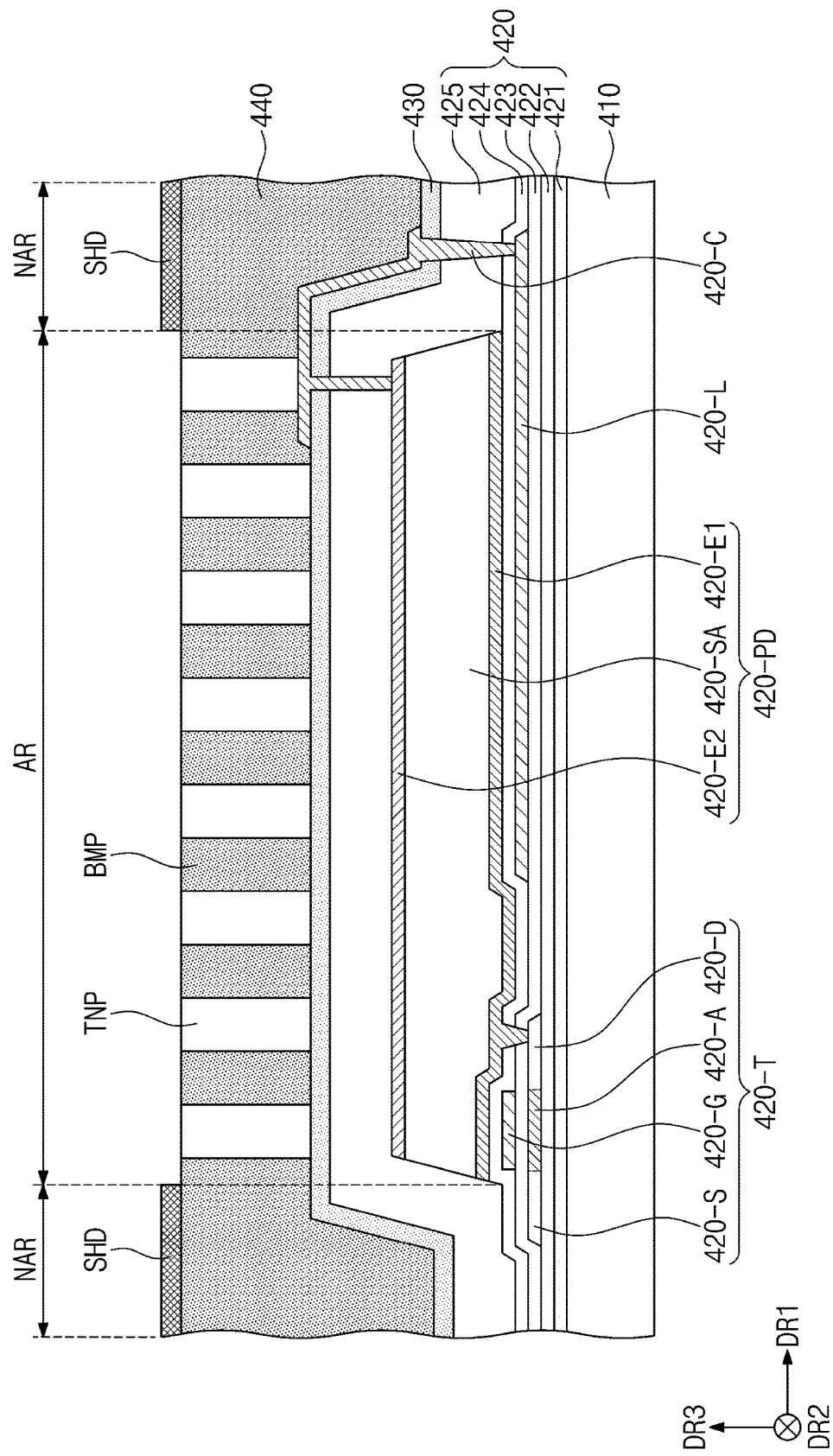

Referring to FIG. 11G, an anti-electrostatic layer SHD may be formed on the light-shield section BMP to overlap the non-sensing area NAR. The anti-electrostatic layer SHD may include one of indium tin oxide (ITO), indium zinc oxide (IZO), zinc oxide (ZnO), and indium tin zinc oxide (ITZO). In other embodiments, the anti-electrostatic layer SHD may have an electrical connection with a ground terminal, thereby receiving a ground voltage.

Referring to FIG. 2, the optical sensor 400 and the display module 300 may be attached to each other through an adhesive layer. The anti-electrostatic layer SHD on the light-shield section BMP may reduce or prevent the likelihood that the sensing layer 420 will receive static electricity that occurs from the display module 300. For example, when a release layer is detached from the display module 300, the static electricity may occur from the display module 300.

For example, the anti-electrostatic layer SHD may enclose the detection area 400-A of FIG. 2 when viewed in a plan view, and may overlap the non-detection area 400-N of FIG. 2. For another example, the anti-electrostatic layer SHD may overlap the non-detection area 400-N and may also overlap a portion of the detection area 400-A. In this case, the anti-electrostatic layer SHD may overlap the non-sensing area NAR of the detection area 400-A.

According to some embodiments of the present disclosure, an optical pattern layer may include transmission sections and a light-shield section that encloses the transmission sections, and the optical pattern layer may serve not only as an organic layer at the top of an optical sensor, but may also control a pathway of light reflected from a fingerprint.

For example, as the optical pattern layer is directly located on an etch stop layer, a reduced distance may be provided between the optical pattern layer and a second sensing electrode of a sensing element. Consequently, it may be possible to prevent or reduce interference of lights that have passed through the optical pattern layer, and thus to increase accuracy of fingerprint recognition.

Some embodiments have been described in the specification and drawings. Although specific terms are used herein, they are merely used for the purpose of describing the present disclosure rather than limiting technical meanings or scopes of the present disclosure disclosed in the claims. Therefore, it will be appreciated by a person of ordinary skill in the art that various modifications and equivalent embodiments can be made from the present disclosure. In conclusion, the authentic technical scope of the present disclosure to be protected shall be determined by the technical concepts of the accompanying claims, with functional equivalents thereof to be included therein.

What is claimed is:

1. A display device, comprising:
 a display module; and
 a sensor layer for detecting light reflected from a user's finger, located below the display module, and comprising:
  a base layer;
  a sensing layer on the base layer and comprising a sensing element for detecting the light and a transistor disposed on the base layer; and
  an optical pattern layer between the sensing layer and the display module, and comprising a light-shield section defining openings arranged at intervals in a plan view, and transmission sections respectively located in the openings,
 wherein the sensing element comprises:
  a first sensing electrode on the base layer;
  a second sensing electrode on the first sensing electrode; and
  a sensing part between the first sensing electrode and the second sensing electrode, and
 wherein an active region of the transistor overlaps the first sensing electrode.

2. The display device of claim 1, wherein the light-shield section encloses the transmission sections in a plan view and does not overlap the transmission sections.

3. The display device of claim 2, wherein the transmission sections comprise a first organic material that allows the light to pass therethrough, and
 wherein the light-shield section comprises a second organic material that absorbs the light.

4. The display device of claim 1, further comprising an etch stop layer between the sensing element and the optical pattern layer.

5. The display device of claim 4, wherein the second sensing electrode is disposed between the first sensing electrode and the etch stop layer.

6. The display device of claim 5, wherein the sensor layer further comprises an insulation layer between the base layer and the etch stop layer, and covering the sensing element, and
 wherein the etch stop layer is directly located on the insulation layer.

7. The display device of claim 6, wherein a thickness of the etch stop layer is less than a thickness of each of the insulation layer and the optical pattern layer.

8. The display device of claim 1, wherein the display module comprises an active area, and a peripheral area adjacent to the active area, and wherein the sensor layer comprises a detection area overlapping the active area.

9. The display device of claim 8, wherein the detection area comprises a sensing area overlapping the sensing element, and a non-sensing area enclosing the sensing area, and
 wherein the transmission sections overlap the sensing area.

10. The display device of claim 9, wherein the light-shield section overlaps the non-sensing area, and
 wherein the optical pattern layer further comprises auxiliary transmission sections overlapping-the non-sensing area.

11. The display device of claim 10, wherein a height of the transmission sections is less than a height of the auxiliary transmission sections in a thickness direction of the sensor layer.

12. The display device of claim 9, wherein the sensor layer further comprises an anti-electrostatic layer located on the light-shield section, the anti-electrostatic layer overlapping the non-sensing area.

13. The display device of claim 1, further comprising an infrared filter between the display module and the sensor layer.

14. The display device of claim 1, wherein the display module comprises:
 a base substrate having a pixel area, and a light-shield area adjacent to the pixel area; and
 a display element layer on the base layer, and comprising an emission layer overlapping the pixel area, and wherein the transmission sections overlap the light-shield area.

15. The display device of claim 1, wherein the optical pattern layer further comprises a mask pattern on the transmission sections, and
wherein the mask pattern does not overlap the light-shield section.

16. A display device, comprising:
a display module; and
an optical sensor for detecting light reflected from a user's finger, located below the display module, and comprising:
a base layer;
a sensing layer on the base layer, and comprising a sensing element that detects the light;
an optical pattern layer between the sensing layer and the display module, and comprising a light-shield section in which openings are arranged at an interval in a plan view, and transmission sections respectively located in the openings and enclosed by the light-shield section in a plan view; and
an etch stop layer between the sensing layer and the optical pattern layer.

17. The display device of claim 16, wherein a planar area of the light-shield section is greater than a planar area of the transmission sections.

18. The display device of claim 16, wherein a distance between the sensing layer and the light-shield section is equal to or less than about 5 micrometers.

19. A method of fabricating a display device, the method comprising:
forming an optical sensor; and
attaching the optical sensor through an adhesive member to a display module, wherein forming the optical sensor comprises:
preparing a base layer;
forming, on the base layer, a sensing element that detects light reflected from a user's finger;
forming, on the base layer, an insulation layer comprising an inorganic material and covering the sensing element;
forming an etch stop layer on the insulation layer and overlapping the sensing element;
forming, directly on the etch stop layer, transmission sections comprising a first organic material; and
forming, directly on the etch stop layer, a light-shield section comprising a second organic material, and not overlapping the transmission sections.

20. The method of claim 19, wherein the light-shield section encloses the transmission sections in a plan view, and
wherein top surfaces of the transmission sections are exposed by the light-shield section.

* * * * *